United States Patent
Potter et al.

(10) Patent No.: US 11,760,518 B2
(45) Date of Patent: Sep. 19, 2023

(54) SYSTEM FOR FORMING AN ARTICLE ARRAY IN A CONTAINER

(71) Applicant: DYCO, INC., Bloomsburg, PA (US)

(72) Inventors: Travis J. Potter, Berwick, PA (US); Peter D. Yohe, Bloomsburg, PA (US); Justin L Mowery, Nescopeck, PA (US); Benjamin M. Kuznicki, Bloomsburg, PA (US)

(73) Assignee: DYCO, INC., Bloomsburg, PA (US)

( * ) Notice: Subject to any disclaimer, the term of this patent is extended or adjusted under 35 U.S.C. 154(b) by 262 days.

(21) Appl. No.: 17/080,139

(22) Filed: Oct. 26, 2020

(65) Prior Publication Data

US 2022/0127030 A1   Apr. 28, 2022

(51) Int. Cl.
| | |
|---|---|
| *B65B 5/06* | (2006.01) |
| *B65B 35/16* | (2006.01) |
| *B25J 15/00* | (2006.01) |
| *B65B 35/50* | (2006.01) |
| *B65G 61/00* | (2006.01) |

(52) U.S. Cl.
CPC ........... *B65B 35/16* (2013.01); *B25J 15/0061* (2013.01); *B65B 5/06* (2013.01); *B65B 35/50* (2013.01); *B65G 61/00* (2013.01); *B65G 2201/0244* (2013.01)

(58) Field of Classification Search
USPC .......................................................... 53/473
See application file for complete search history.

(56) References Cited

U.S. PATENT DOCUMENTS

| | | | | |
|---|---|---|---|---|
| 5,611,193 | A  * | 3/1997 | Farrelly ................. | B65B 21/18 53/252 |
| 2011/0005174 | A1 * | 1/2011 | Prahm .................... | B65B 5/061 901/50 |
| 2011/0254298 | A1 * | 10/2011 | Lomerson, Jr. ...... | B25J 15/0616 294/188 |
| 2011/0293397 | A1 * | 12/2011 | Lomerson, Jr. ........ | B25J 15/024 414/800 |
| 2015/0158656 | A1 * | 6/2015 | McKinnon ............ | B31B 50/142 220/592.2 |
| 2016/0318189 | A1 * | 11/2016 | Yohe .................... | B25J 15/0206 |

* cited by examiner

*Primary Examiner* — Chinyere J Rushing-Tucker
(74) *Attorney, Agent, or Firm* — McNees Wallace & Nurick LLC

(57) ABSTRACT

A head for use in forming an article array in a container cavity ("cavity") by sequential placement of adjacent article rows in the cavity, including a gripper having a frame having a longitudinal axis, the gripper adapted to selectively engage and disengage an article row for permitting placement thereof; and a flexible layer connected to the frame and extending parallel to the longitudinal axis and positioned to one side of the gripper. During formation of the article array in the cavity, the flexible layer preventing contact between a most recently positioned article row in the cavity and a corresponding article row being positioned in the cavity, including filling a remaining unfilled portion of the cavity between a penultimate article row and the container for receiving the final article row having a width approximately equal to or less than a width of the final article row.

20 Claims, 22 Drawing Sheets

SYSTEM FOR FORMING AN ARTICLE ARRAY IN A CONTAINER

FIELD OF THE INVENTION

The present invention is directed to head, a system, and a method for forming an article array in a container.

BACKGROUND OF THE INVENTION

It is common to manufacture empty articles at one facility and then transport those empty articles to another facility for filling the empty articles with product for shipping to different locations. Furthermore, it is becoming more common to sequentially place adjacent article rows in a container cavity from a first side toward a second side of the container, forming article arrays, and/or stacked article arrays, using a robotic arm connected to a head. This arrangement permits repeatably tight packing of the articles, as well as permitting the container to be reused for shipping the product-filled article arrays.

Unfortunately, it may not be practical for a facility that may need to manufacture and ship numerous differently sized articles to stock more than one or two differently sized containers. As a result, there can be difficulties associated with loading the article rows into the container due to the varying arrangements and fit clearances of the article rows and article arrays in the containers, and most notably, loading the last article row to form the article array, especially when the width of the last remaining portion of the container cavity to receive the last article row to complete the article array is approximately equal to or even less than the width of the last remaining portion of the container cavity, possibly requiring a small amount of deformation of the articles of the articles row(s). Additionally, some customers require the container to include a liner, commonly referred to in the industry as Bag liners, which liners may be damaged as a result of friction between the last article rows and the liner during installation of the last article rows. This problem is further exacerbated when the newly manufactured articles are composed of certain materials such as polyethylene terephthalate, commonly referred to as PET, which are especially susceptible to sticking together, up to several days after manufacture.

There is a need for an improved head, system, or method of forming an article array in a container that do not suffer from these shortcomings.

SUMMARY OF THE INVENTION

In an embodiment, a head for use in forming an article array in a container having an open end and defining a cavity having a first side and an opposed second side, includes a gripper having a frame having a longitudinal axis, the gripper adapted to selectively engage and disengage an article row for permitting placement thereof. The head further includes a flexible layer connected to the frame and extending parallel to the longitudinal axis and positioned in close proximity to one side of the gripper. The head further includes during formation of an article array in a container having an open end and defining a cavity having a first side and an opposed second side, the article array being formed by sequential placement of adjacent article rows in the container cavity from the first side toward the second side by the head, the flexible layer preventing contact between a most recently positioned article row in the container cavity and a corresponding article row being positioned in the container cavity. The head further includes in a final pre-formation arrangement of the article array, the most recently positioned article row is a penultimate article row in the container cavity and the corresponding article row being positioned in the container cavity is a final article row for completing formation of the article array. The head further includes in response to the article array being in the final pre-formation arrangement, the final pre-formation arrangement having a remaining unfilled portion of the container cavity between the penultimate article row and the container for receiving the final article row having a width approximately equal to or less than a width of the final article row.

In another embodiment, a system for forming an article array in a container having an open end and defining a cavity having a first side and an opposed second side, includes a gripper having a frame having a longitudinal axis, the gripper adapted to selectively engage and disengage an article row for permitting placement thereof. The system further including a flexible first layer connected to the frame and extending parallel to the longitudinal axis and positioned in close proximity to one side of the gripper, and a second layer. The system further including during formation of an article array in a container having an open end and defining a cavity having a first side and an opposed second side, the article array being formed by sequential placement of adjacent article rows in the container cavity from the first side toward the second side by the head, the flexible first layer preventing contact between a most recently positioned article row in the container cavity and a corresponding article row being positioned in the container. The system further including in a final pre-formation arrangement of the article array, the most recently positioned article row is a penultimate article row in the container cavity and the corresponding article row being positioned in the container cavity is a final article row for completing formation of the article array. In response to the article array being in the final pre-formation arrangement, the final pre-formation arrangement having a remaining unfilled portion of the container cavity between the penultimate article row and the container for receiving the final article row, the second layer covers at least the second side of the remaining unfilled portion of the container cavity, the remaining unfilled portion of the container cavity having a width that is approximately equal to or less than a width of the final article row.

In a further embodiment, a method for forming an article array in a container using a head of claim 1, includes providing a container having an open end and defining a cavity having a first side and an opposed second side. The method further includes sequentially placing adjacent article rows in the container cavity along the first side toward the second side by the head, the head preventing contact between each adjacent article row during their placement in the container cavity according to a sequence of having a most recently positioned article row in the container followed by a corresponding article row being positioned in the container cavity, wherein in a final pre-formation arrangement of the article array, the most recently positioned article row is a penultimate article row in the container cavity and the corresponding article row being positioned in the container cavity is a final article row for completing formation of the article array, wherein in response to the article array being in the final pre-formation arrangement, the final pre-formation arrangement having a remaining unfilled portion of the container cavity between the penultimate article row and the container for receiving the final article row having a width approximately equal to or less than a width of the final article row.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
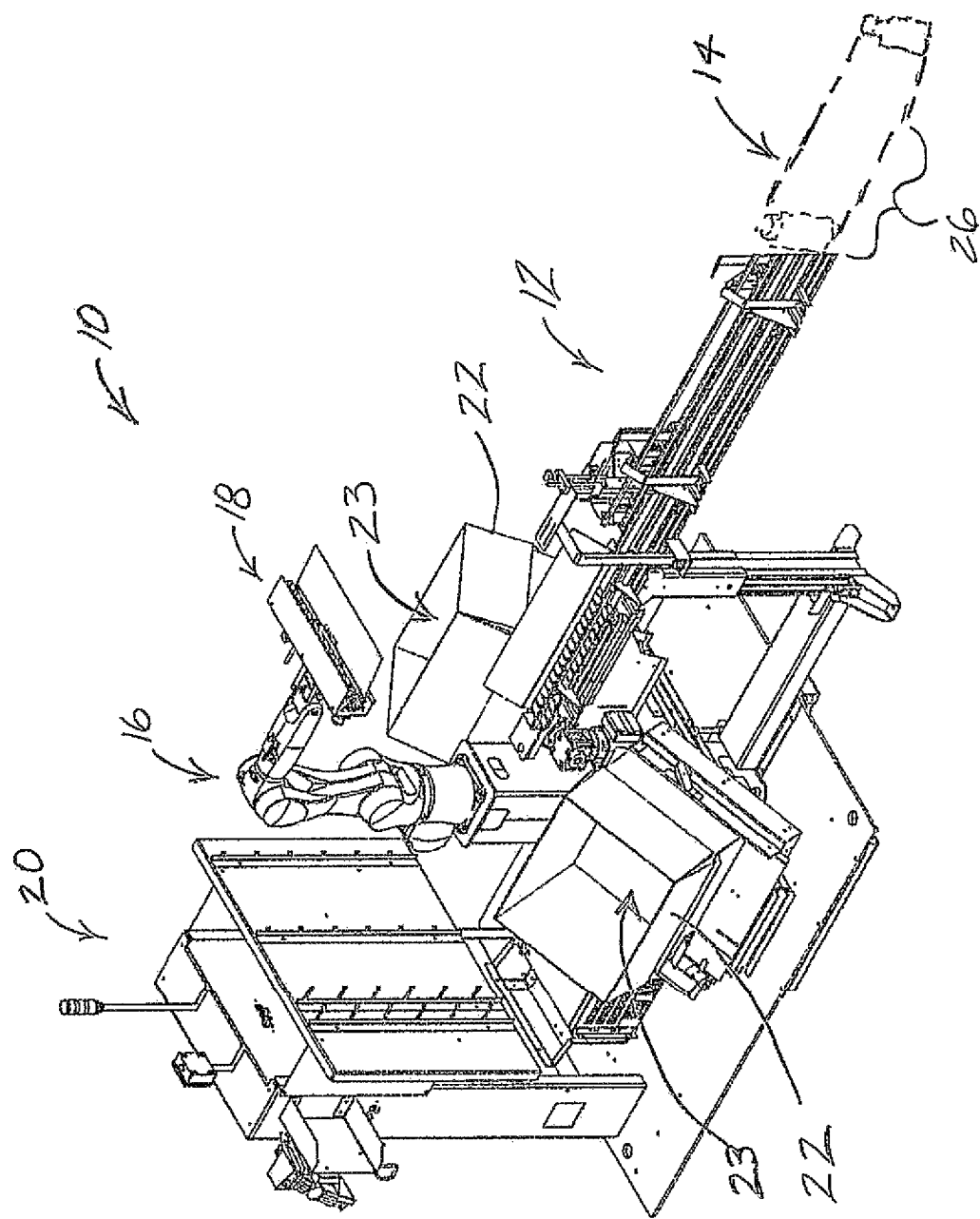
FIG. 1 is an upper perspective view of an exemplary system for building article arrays in containers.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

FIG. 1 shows a system 10 for use in forming article arrays in a container 22. System 10 utilizes a controller 20 for controlling the operation of system components in a known manner. As shown, system 10 includes a conveyor 12 that conveys articles 14 therealong. A head 18 of a robot arm 16 engages and carries article rows 26 from conveyor 12 for installation in containers 22, sequentially building or forming article arrays 24 (FIG. 2) in respective cavities 23 of containers 22 as will be further discussed below.

Figure 2:
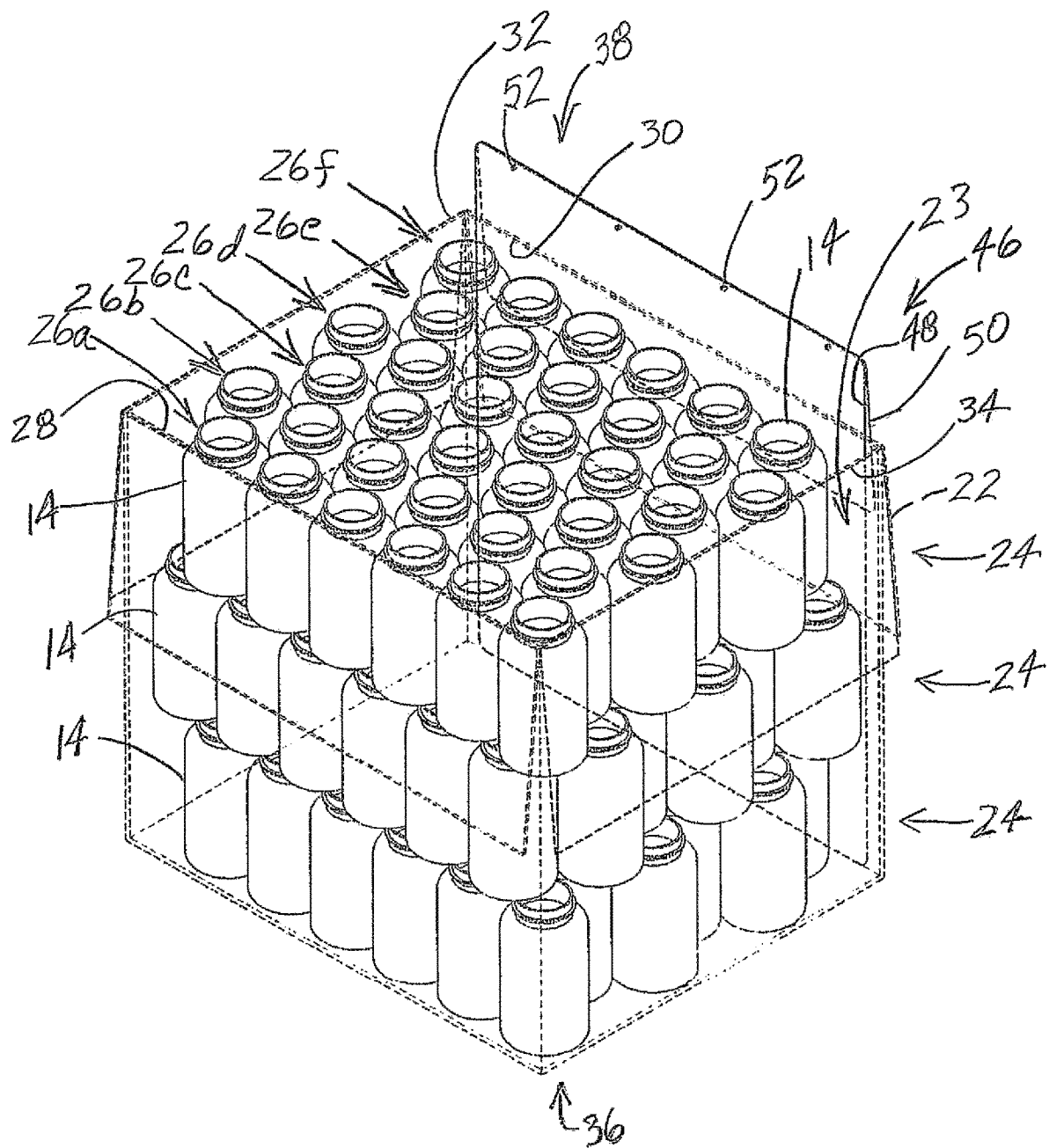
FIG. 2 is an upper perspective view of a container filled with article arrays.
Figure 3:
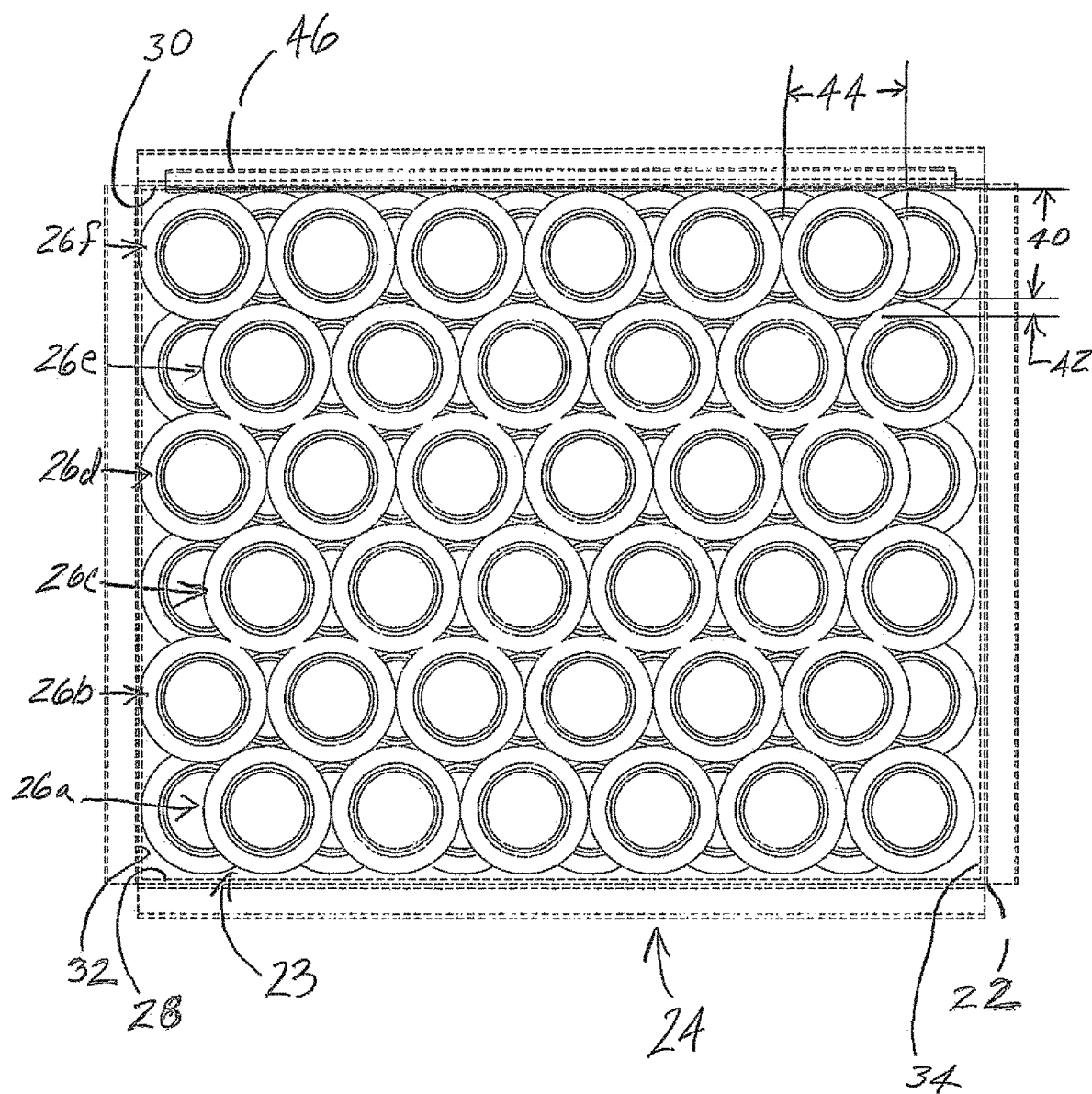
FIG. 3 is a plan view of the container of FIG. 2.

As shown in FIGS. 2-3, container 22 includes opposed sides 28, 30 and opposed sides 32, 34 positioned between sides 28, 30, collectively interconnected to define a cavity 23 having a closed rectangular geometry. Container 22 includes a bottom or closed end 36 (FIG. 2) and a top or open end 38 (FIG. 2) for receiving article rows 26 therein for forming or building article array(s) 24 inside or within container cavity 23, depending upon whether the height of the container is sufficient to receive one or more article arrays 24 vertically stacked on top of one another. For example, as shown in FIG. 2, container 22 contains three stacked article arrays 24 therein. As further shown in FIG. 2, to form each article array 24, article rows 26a, 26b, 26c, 26d, 26e, 26f are sequentially inserted or placed in container cavity 23, beginning at side 28 with article row 26a, and successively placing adjacent article rows 26b-26e toward side 30 to fill the corresponding portions of container cavity 23. As shown, articles 14 have a circular cross section, and as such, each of adjacent article rows 26a-26e are staggered, thereby providing additional room to arrange the article rows and/or providing room to accommodate one or more additional article rows in the same article array. It is appreciated that other article cross sections, such as a rectangular cross section may preclude staggering between adjacent article rows.

It is appreciated by those having ordinary skill in the art that the number of article rows and the number of article arrays that may be placed in a container may be different from those disclosed in the present invention, and that the present invention contemplates any number of article rows and article arrays that may be formed in a container.

As further shown in FIG. 3, which shows a top article array 24 in container cavity 23. It can be appreciated by one having ordinary skill in the art that a number of the problems associated with building array articles as previously discussed arise during the final stages of article array formation. That is, during earlier stages of article array formation, the unfilled portion of the article array is sufficiently wide to permit a head placing an article array row to place the article row. Conceptually, for purposes of discussion and to help clarify the problems associated with article array formation in a container cavity, if only article row 26a had been placed in container cavity 23, with it being desirable not to bring the next article row 26 into contact with article row 26a during placement of the next adjacent article row 26 (becoming article row 26b when placed in container cavity 23), it would be possible to initially position the article row 26 being placed at what is shown in FIG. 3 as the final position of article row 26c, and then laterally moving the article row 26 being placed from the final position of article row 26c to its final position for article row 26b. While this methodology may be acceptable to further place article rows 26c-26e, problems arise when the "extra room" of the container cavity is eliminated.

That is, in a final pre-formation arrangement of article array 24, the most recently positioned article row 26e is a penultimate article row in container cavity 23, and the corresponding article row 26 being positioned in container cavity 23 becomes a final article row 26f when formation of article array 24 is completed. More specifically, as shown in FIG. 3, the width of the unfilled portion of the container cavity is identified as a distance 40, which is the distance between side 30 of container 22 and the closest facing portion of penultimate article row 26e as measured in a direction perpendicular to side 30, although the width of the unfilled portion of the container cavity 23 is increased at predetermined positions (separated by a width 44 of the articles of article row 26e) by an overlap distance 42, which is available when the row to be placed is staggered relative to article row 26e.

When the unfilled portion of the container cavity 23 has a width (which is between distance 40 and the sum of distance 40 and 42) that is approximately equal to or less than of the width of 44 of article row 26f, damage to one or more of the articles, a Bag liner, or even the container, such as by a head installing the article row, may occur.

For purposed herein, the term "approximately equal to" is intended to mean that the unfilled portion of the container cavity for receiving the final article row for completing formation of the article array is up to 0.5 inch larger than the width of the final article row.

In one embodiment, as shown in FIG. 2, an optional layer 46 includes a layer member 48 positioned in close proximity to side 30 that extends from above open end 38 of container 22 toward closed end 36, and is adapter to be positioned over and protect a corresponding portion of a liner 54 commonly referred to as a Bag liner installed in container 22. Layer member 48 is composed of a low friction material such as Teflon® or other suitable material or coated with a suitable material to provide a low friction surface. As shown, one end of layer member 48 is secured to layer member 50 by mechanical fasteners 52, defining a retainer, permitting layer 46 to be secured in position over the lip of open end 38 of container 22. In one embodiment, layer 46 may be of one-piece construction.

Figure 4:
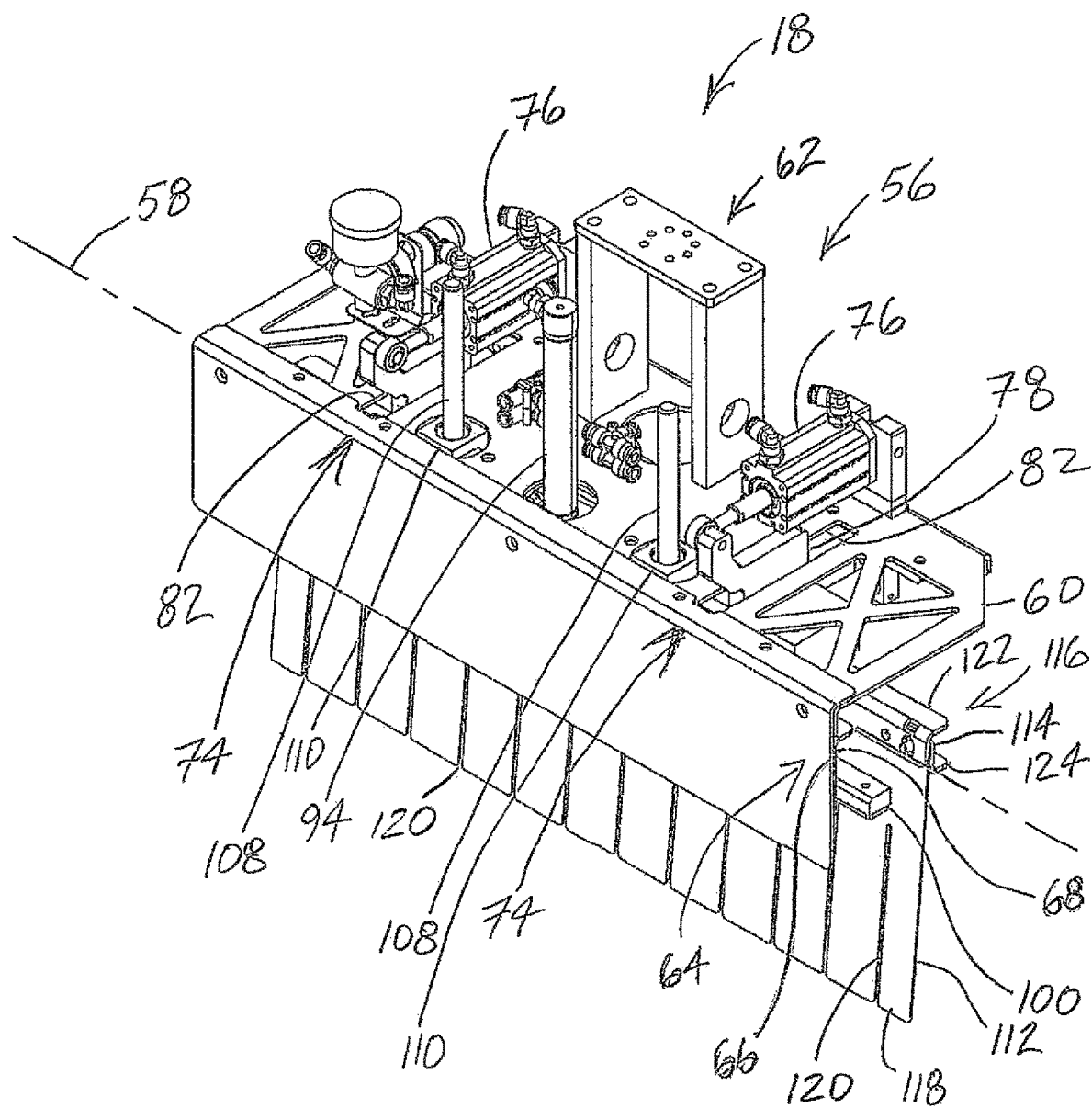
FIG. 4 is an upper perspective view of an exemplary head for selectively engaging and disengaging article rows.
Figure 5:
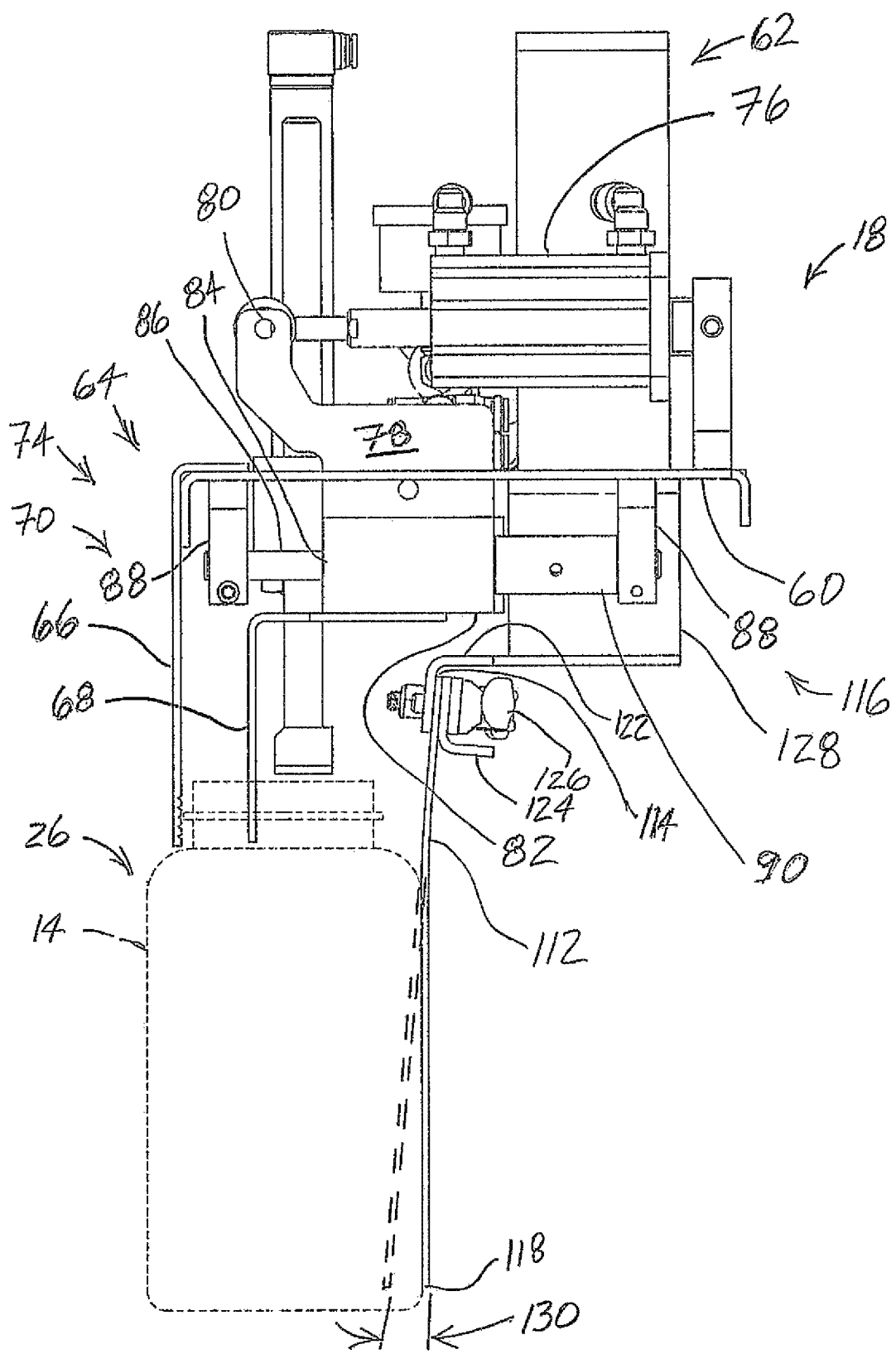
FIG. 5 is an end view of the head of FIG. 4 with grippers in an article row disengaged position.
Figure 6:
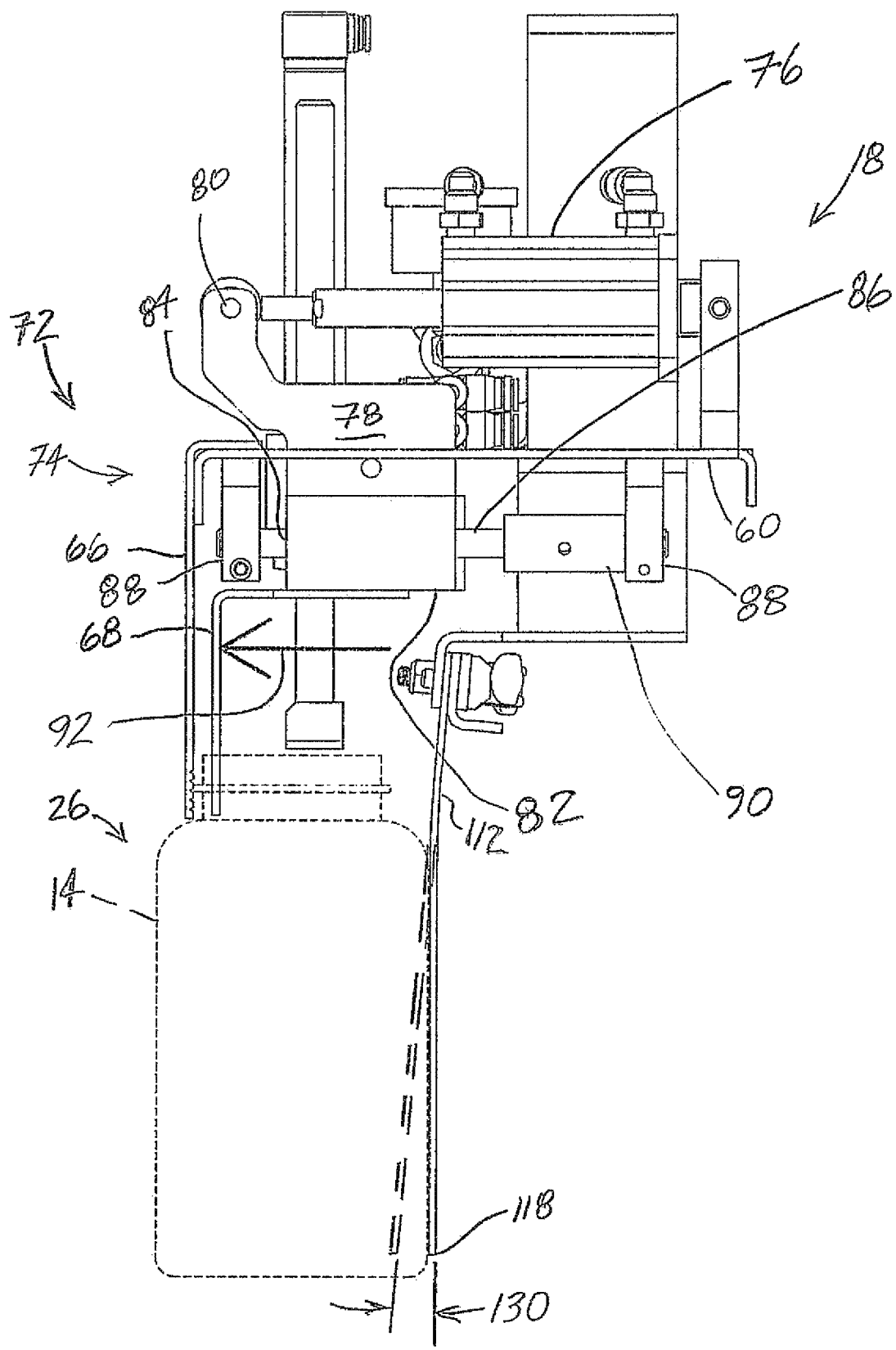
FIG. 6 is an end view of the head of FIG. 4 with grippers in an article row engaged position.

FIGS. 4-8 show head 18 for placing article rows for forming article arrays. More specifically, as shown in FIG. 4, head 18 includes a frame 56 having a longitudinal axis 58, with frame 56 including a frame member 60 connected to a standoff 62 that is connected to robot arm 16 (FIG. 1) for positioning head 18 during operation. As shown in FIG. 5, head 18 includes a gripper 64 that includes a pair of gripper members 66, 68 adapted for selectively engaging and disengaging the necks of articles 14 of article row 26 for forming article array 24 (FIG. 2). In one embodiment, grippers may selectively engage and disengage portions other than the necks of the articles of the article row. As further shown in FIG. 5, gripper member 66 is non-movably connected to or affixed to frame member 60, and gripper member 68 is movable between a non-engaged or open position 70 and an engaged or closed position 72 (FIG. 6). That is, as shown, gripper member 68 is guidingly movable relative to frame 60 by a pair of actuators 76 (FIG. 4) such as pneumatic or hydraulic actuators each urging a respective mechanical linkage 74 between open and closed positions 70, 72. Mechanical linkage 74 includes a fitting 78 including a rotatable connection 80 at one end of fitting 78, with fitting 78 extending through an opening 80 (FIG. 4) formed in frame member 60 and being affixed at an opposed end 82 to gripper member 68. Fitting 78 includes an opening 84 formed therethrough in close proximity to end 82 for slidably receiving a guide 86 that is secured to frame member 60 by opposed posts 88. Guide 86 includes a guide portion 90 that acts as a stop for establishing the maximum spacing between gripper members 66, 68 when gripper member 68 is urged in a direction away from gripper member 66 toward open position 70 by actuators 76. Conversely, as a result of actuators 76 being actuated in an opposite direction, actuators 76 urge fitting 78 and gripper member 68 in a movement direction 92 (FIG. 6) toward closed position 72 (FIG. 6) for engaging the neck of articles 14 of article row 26.

Figure 7:
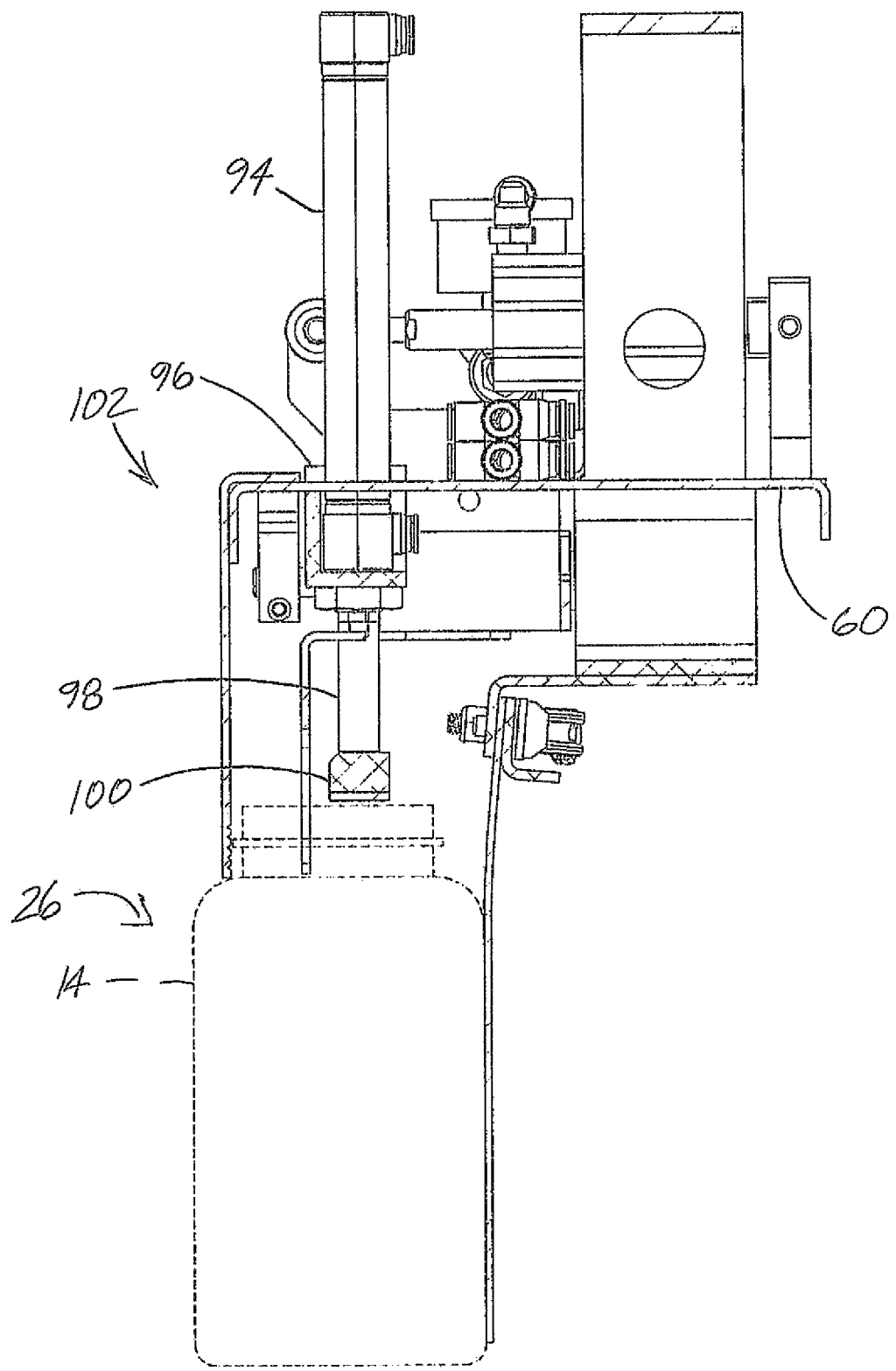
FIG. 7 is a cutaway end view of the head of FIG. 4 with a pusher in a retracted position.
Figure 8:
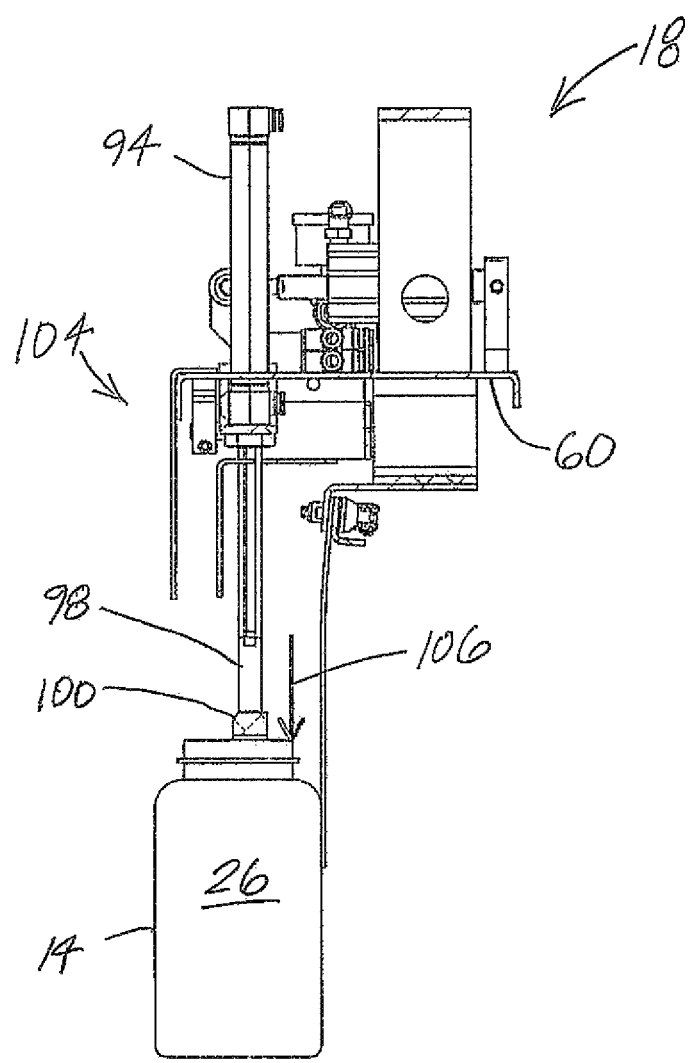
FIG. 8 is a cutaway end view of the head of FIG. 7 with a pusher in an extended position.

As shown in FIG. 4 an actuator 94 such as a pneumatic or hydraulic actuator is secured to frame member 60 by a fitting 96 (FIG. 7). Actuator 94 includes a rod 98 (FIG. 7) extending from actuator 94 at one end, terminating at an opposite end that is affixed to a pusher 100 (FIG. 7). A pair of guides 108 each slidably extend through a corresponding fitting 110 affixed to frame member 60, guides 108 terminating at an end that is affixed to a pusher 100 (FIG. 7; only one guide 108 is shown terminating at pusher 100 in FIG. 7). FIG. 7 shows actuator 94 in a retracted position 102, in which pusher 100 is positioned either in contact with or spaced in close proximity to and above article row 26. Conversely, FIG. 8 shows actuator 94 in an extended position 104, in which actuator rod 98 urges pusher 100, as well as article row 26 (by virtue of article row 26 being maintained in contact with article row 26) in a movement direction 106 away from pusher 100 to effect separation of head 18 from article row 26. As will be discussed in further detail below, while pusher 100 is being urged downwardly toward extended position 104, head 18 is simultaneously being moved in an opposite direction (raised upwardly), the preferable net effect being that pusher 100, which is in contact with article row 26, is essentially not moving relative to the article row 26, nor applying a downward force to the article row 26, as the robot arm is raising the head at approximately the same rate.

As shown in FIG. 4, head 18 includes a flexible layer 112 having an end 114 connected to frame 56 positioned in close proximity to one side of gripper 64, which end 114 of layer 112 extending parallel to longitudinal axis 58. Layer 112 extends from end 114 to an opposed end 118 in a direction away from frame 56. End 114 of layer 112 is secured to frame 56 by a retainer 116 having retainer portions 122, 124 sandwiching end 114 therebetween secured in position by mechanical fasteners 126 (FIG. 5). Retainer portion 122 extends to a centrally positioned base portion 128 (FIG. 5) that is secured to frame member 60. Differently sized retainers 116 may be used to vary the distance from grippers 64, such as to accommodate differently sized articles 14 (FIG. 5) and article rows 24 (FIG. 5). Optionally, layer 112 includes one or more slots 120 formed therein, permitting the corresponding "fingers" defined by the plurality of slots 120 to deflect and/or twist as needed to maintain separation between or prevent contact between article rows already placed in the container cavity and the article row being placed that may be staggered, as will be discussed in further detail below. In one embodiment, no slots are needing to be formed in layer 112 irrespective staggering (or an absence of staggering; e.g., rectangular articles) between the article rows already placed in the container cavity and the article row being placed. Preferably, as shown in FIG. 6, layer 112 subtends a small angle 130 so that when gripper members 66, 68 engage article row 24 in closed position 72, layer 112 at least tangentially contacts the surface of articles 14 of article row 26. In one embodiment, layer 112 at least partially conformally contacts the surface of articles 14 of article row 26. In one embodiment, layer 112 at least tangentially contacts the surface of essentially the full height of the articles (minus the threaded neck or neck portion of the articles). By virtue of layer 112 contacting article surface, the thin, flexible layer advantageously adds virtually no additional thickness (e.g., approximately 0.1 inch or less) to the article row being placed, thereby simplifying the article array forming. In one embodiment, layer 112 may have a thickness greater than 0.1 inch. Moreover, by virtue of flexible layer 112 being composed of a low friction material, such as Teflon® or other suitable material or being impregnated with or having a low friction coating applied to the layer, article array forming may be achieved, even when the width of the last remaining container cavity for receiving the final article row being placed to complete the article array is approximately equal to or less than the width of the final article row.

For purposes herein the term "flexible" is intended to not only mean capable of bending easily without breaking and being pliable, but having the ability to remain in a deflected position such as the layer maintaining its position in contact with the surface of the article row with the grippers in a closed position, while continuously resisting moving away (drooping) from the article row surface such as from the layer's own weight during manipulation of the article row by the robotic arm.

FIGS. 9-22 show sequential movements or steps for forming or building an article array 24 (FIG. 2) in a container 22 having an open end 38 and a closed end 36 and two pairs of opposed sides 28, 30 and 32, 34, container 22 defining a cavity 23, with article array 24 being formed by sequential placement of adjacent article rows 26a, 26b, 26c, 26d, 26e, 26f in container cavity 23, beginning at side 28 with article row 26a, and successively placing adjacent article rows 26b-26e toward side 30 to fill the corresponding portions of container cavity 23. While head 18 is moving/positioning each article row 26 to be placed, especially while moving the article row to be placed from conveyor 12 (FIG. 1) toward container 22 or prior to placing the article row to be placed in contact with a container support surface (closed end 36), or on top of a previously placed or formed or installed article array in the container cavity, gripper 64 of head 18 is engaging the article row to be placed in a closed position 72. An optional liner 54 is shown lining the surfaces of container cavity 23, as well as an optional layer 46 positioned in close proximity to side 30 that extends from above open end 38 of container 22 toward closed end 36, and is adapted to be positioned over and protect a corresponding portion of liner 54.

Figure 9:
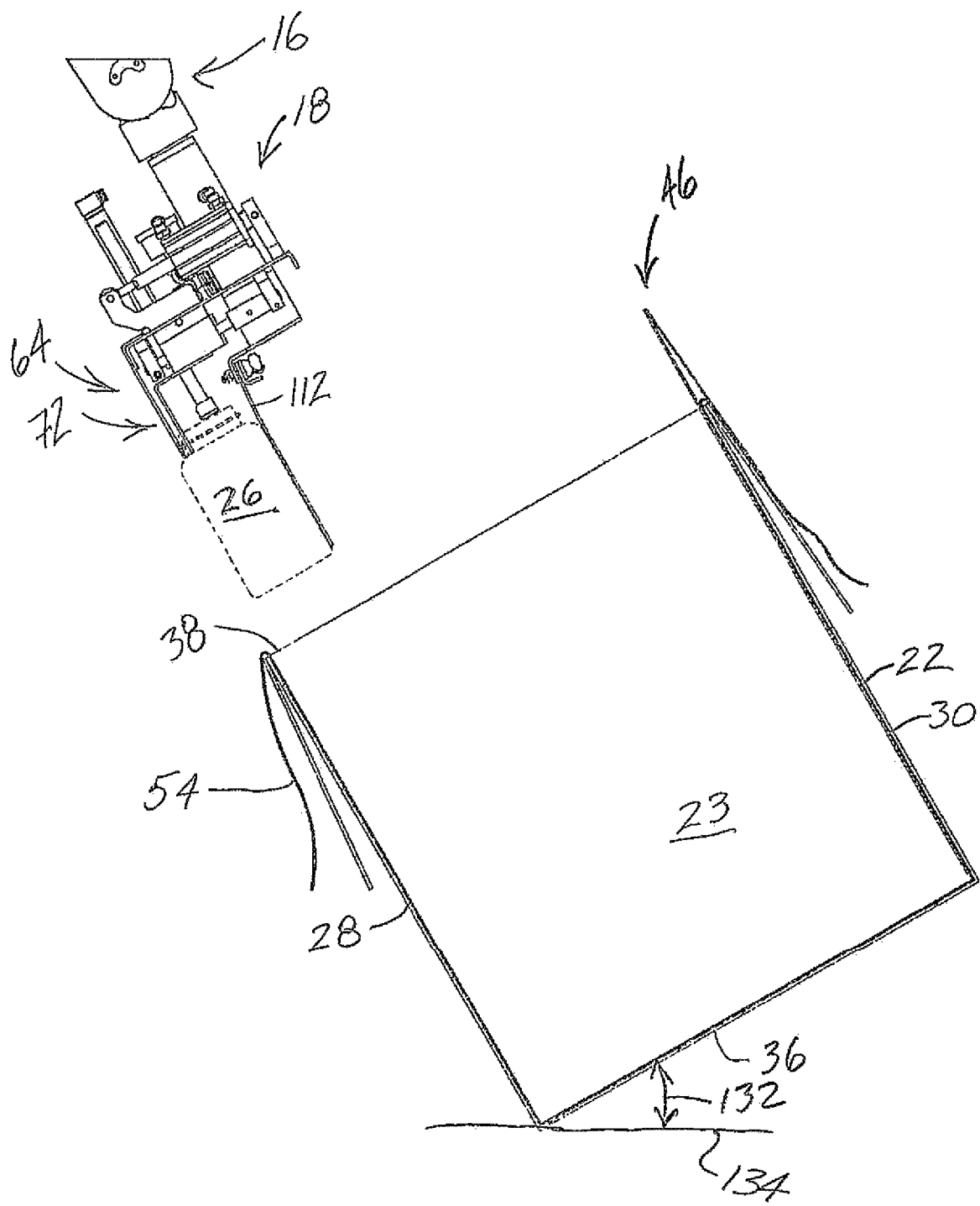
FIGS. 9-22 are sequential movements for forming or building an article array in a container.

FIG. 9 shows head 18 engaging article row 26 to be placed, in which head 18 positions the article row to be placed in general alignment with open end 38 and side 28 of container 22. As shown, the cross section of the articles, and therefore, of the article row to be placed, is constant, and as such, general alignment of the article row would mean the lateral surfaces of the articles and article rows being placed in container cavity 23 are generally parallel with sides 28, 30 and are further aligned to be received through open end 38. However, even if the cross section of articles of the article row 26 to be placed is not uniform, the general alignment may be the same. As shown in FIGS. 9-22, container 22 is positioned such that closed end 36 subtends an acute angle 132 with a support surface defining a horizontal plane 134 such as 30 degrees to promote a more stable arrangement for forming the article array. In one embodiment, closed end 36 of container 22 may be oriented parallel to horizontal plane 134, or stated another way, angle 132 is zero. In one embodiment, closed end 36 is positioned such that closed end 36 subtends an acute angle 132 that is different from zero or 30 degrees.

Figure 10:
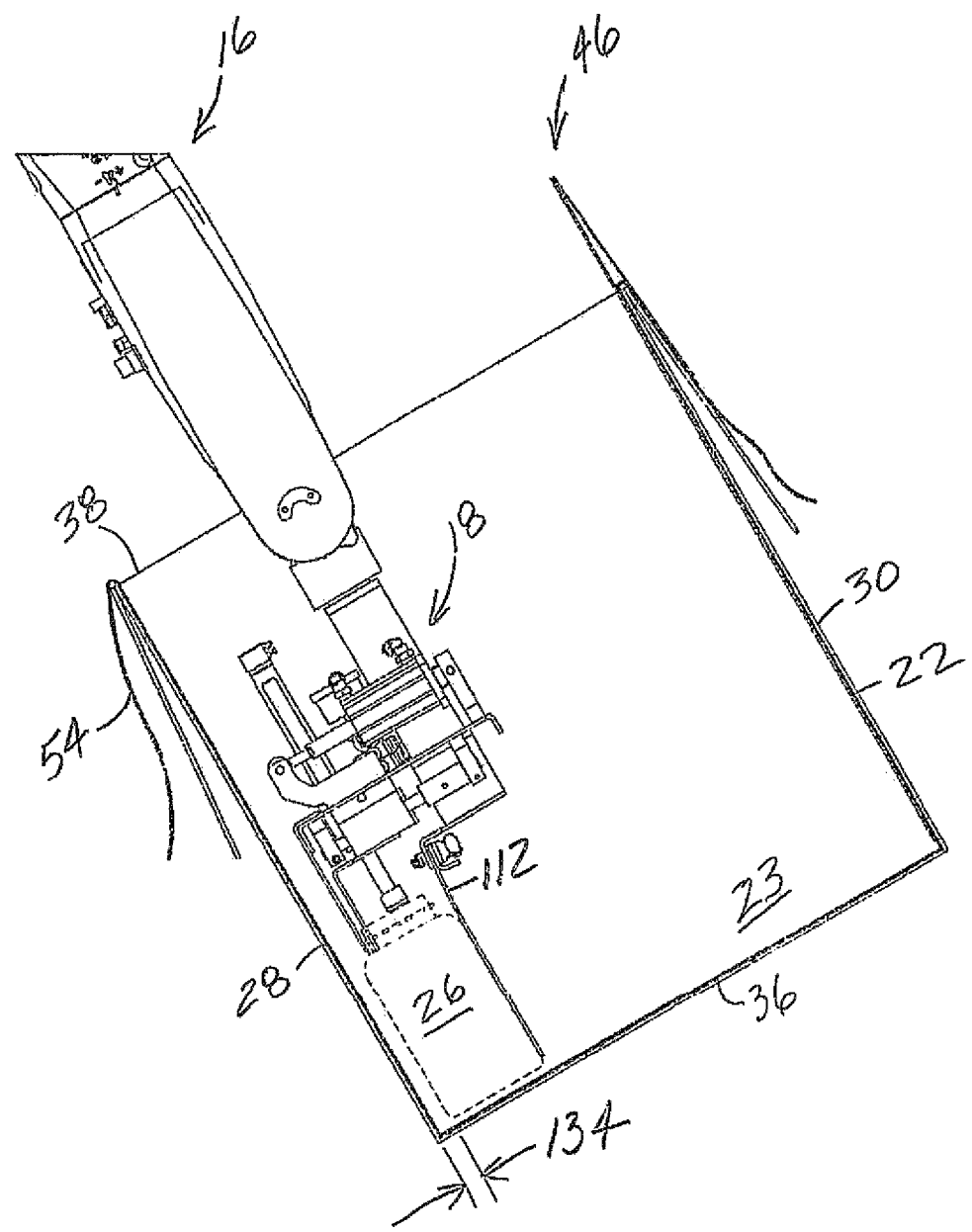

As shown in FIG. 10, head 18 and article row 26 to be placed are directed by robotic arm 16 through open end 38 and generally parallel to side 28, the lateral sides of article row 26 to be placed maintaining a small separation distance 134 from side 28 to avoid friction that may result in damage of the article row to be placed, or one or more of the article row to be placed sticking to side 28. As further shown in FIG. 10, article row 26 to be placed has not yet been moved into contact with closed end 36 of container 22. Head 18 is oriented such that grippers 64 face side 28. Although the separation distance would be greater than distance 134, and additional manipulation of head 18 may be required to move article row 26 to be placed in its final position in container cavity 23, in one embodiment, head 18 may be oriented such that layer 112 faces side 28. Moreover, except for placement of the final article row to be placed to complete the article array which requires gripper 64 of head 18 to be oriented to face side 30, head 18 may utilize either head orientation for installation of all other article rows to be placed while forming the article array.

Figure 11:
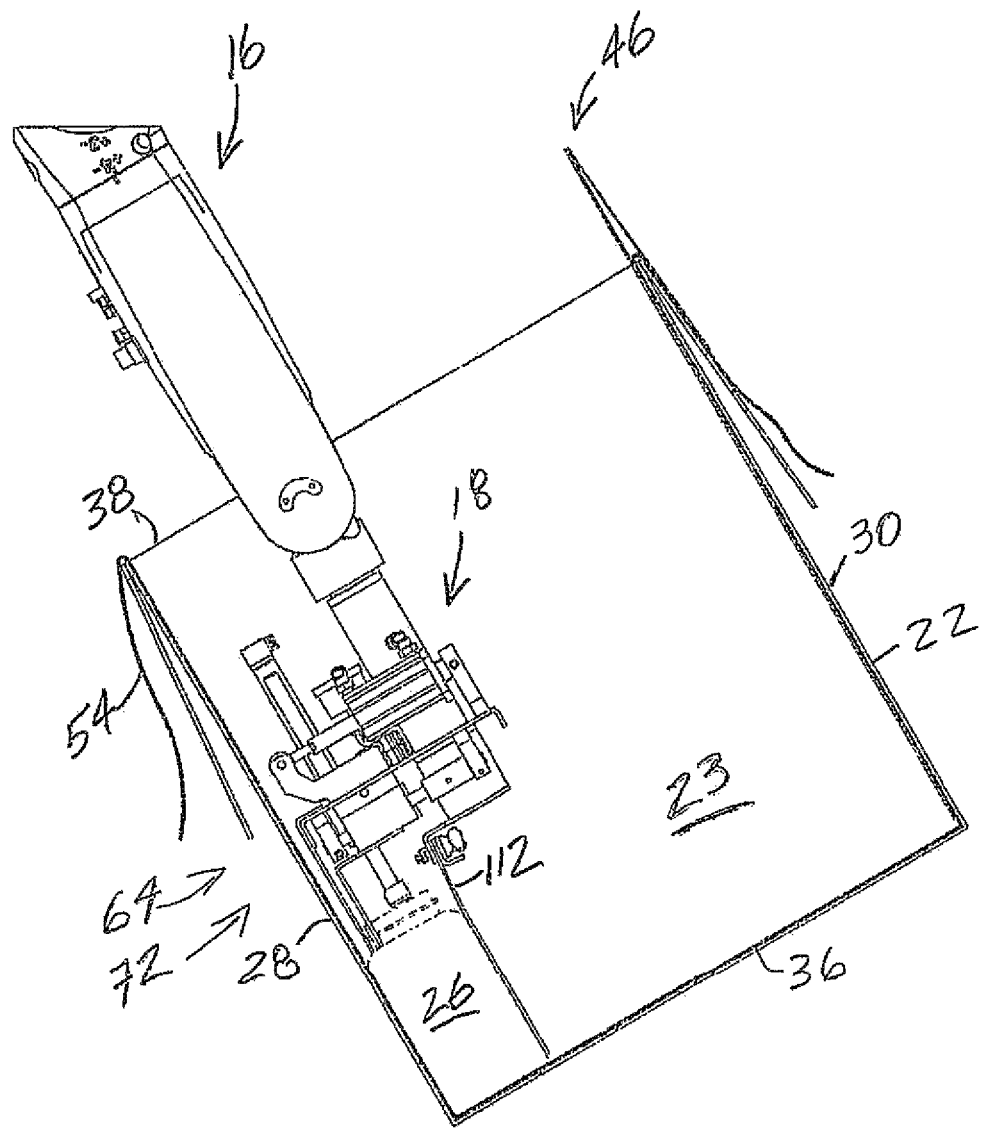
Figure 12:
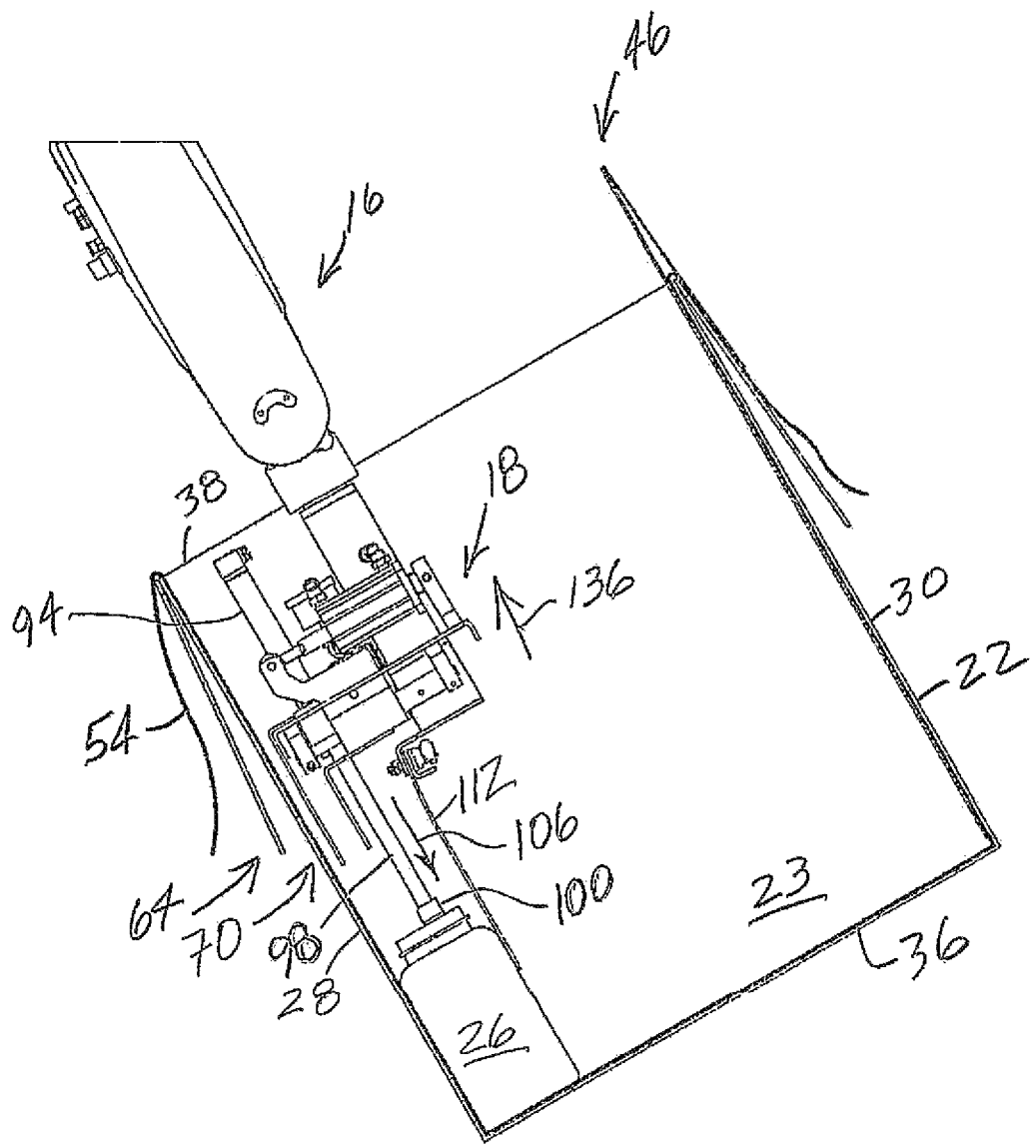
Figure 13:
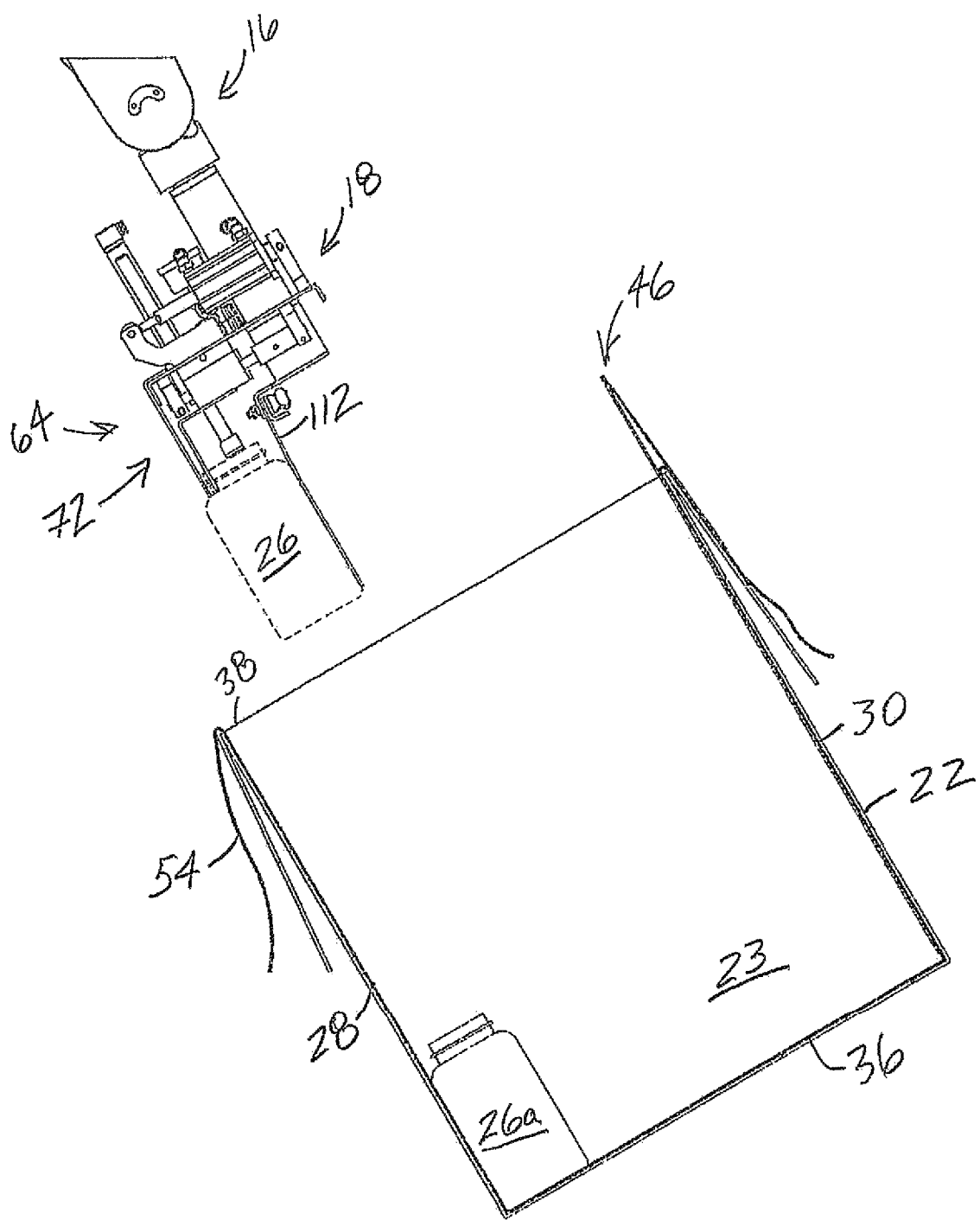

FIG. 11 shows head 18 further directing article row 26 to be placed in contact with both side 28 and closed end 36 of container cavity 23. Once article row 26 to be placed is in contact with both side 28 and closed end 36 of container cavity 23, as shown in FIG. 12, head 18 begins separating from article row 26 to be placed as a result of gripper 64 moving from closed position 72 (FIG. 11) to open position 70, and head 18 moving in a movement direction 136 away from closed end 36 of container cavity 23 that is generally parallel to side 28. Simultaneously, rod 98 extends from actuator 94 such that pusher 100, which was at least in close proximity, if not in physical contact with the top ends of articles of article row 26 to be placed prior to grippers 64 engaging article row 26 to be placed prior to moving article row 26 to be placed from conveyor 12 (FIG. 1), is brought into and maintained in physical contact or contact or is maintained in physical contact with article row 26 to be placed. Moreover, preferably, the travel speed of head 18 in movement direction 136 is essentially the same as the travel speed of rod 98 and pusher 100, albeit in opposed directions. As a result, pusher 100 remains in stabilizing contact or physical contact with the top ends of article row 26 to be placed, becoming article row 26a (FIG. 13) of the article array being formed after separation from head 18. FIG. 13 further shows head 18 being directed by robotic arm 16 to bring from conveyor 12 (FIG. 1) a subsequent article row 26 to be placed that is directed in general alignment with open end 38 and side 28 of container 22, although the alignment with side 28 is more accurately an offset from side 28 by approximately the width of article row 26a.

Figure 14:
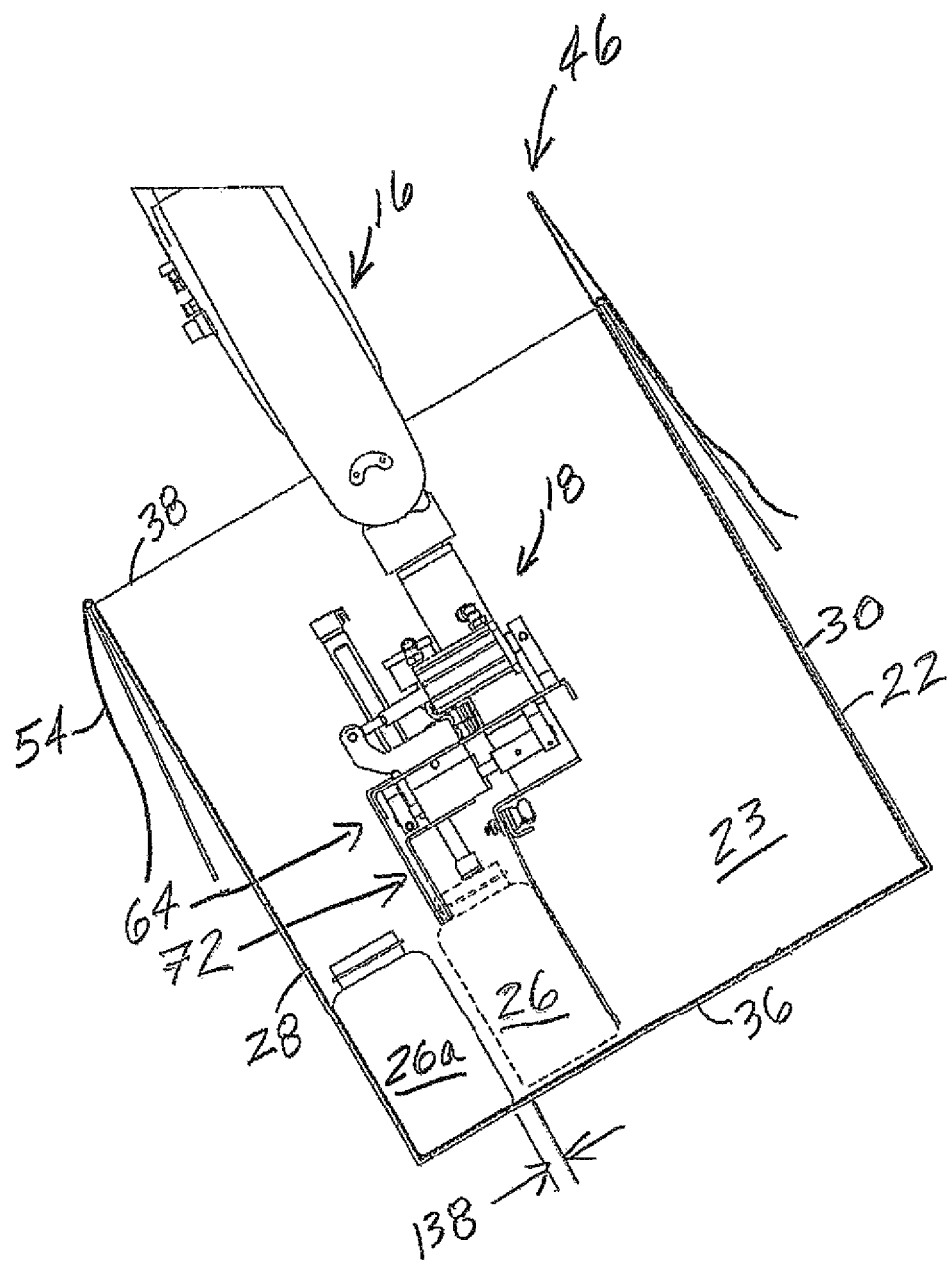

As shown in FIG. 14, head 18 and article row 26 to be placed are directed by robotic arm 16 through open end 38 and generally parallel to side 28, albeit further offset from side 28 by the width of article row 26a, the lateral sides of article row 26 to be placed maintaining a small separation distance 138 from article row 26a. As further shown in FIG. 14, article row 26 to be placed has not yet been moved into contact with closed end 36 of container 22. Head 18 is oriented such that grippers 64 face side 28. Although the separation distance would be greater than distance 138, and additional manipulation of head 18 may be required to move article row 26 to be placed in its final position in container cavity 23 relative to article row 26a, in one embodiment, head 18 may be oriented such that layer 112 faces side 28.

Figure 15:
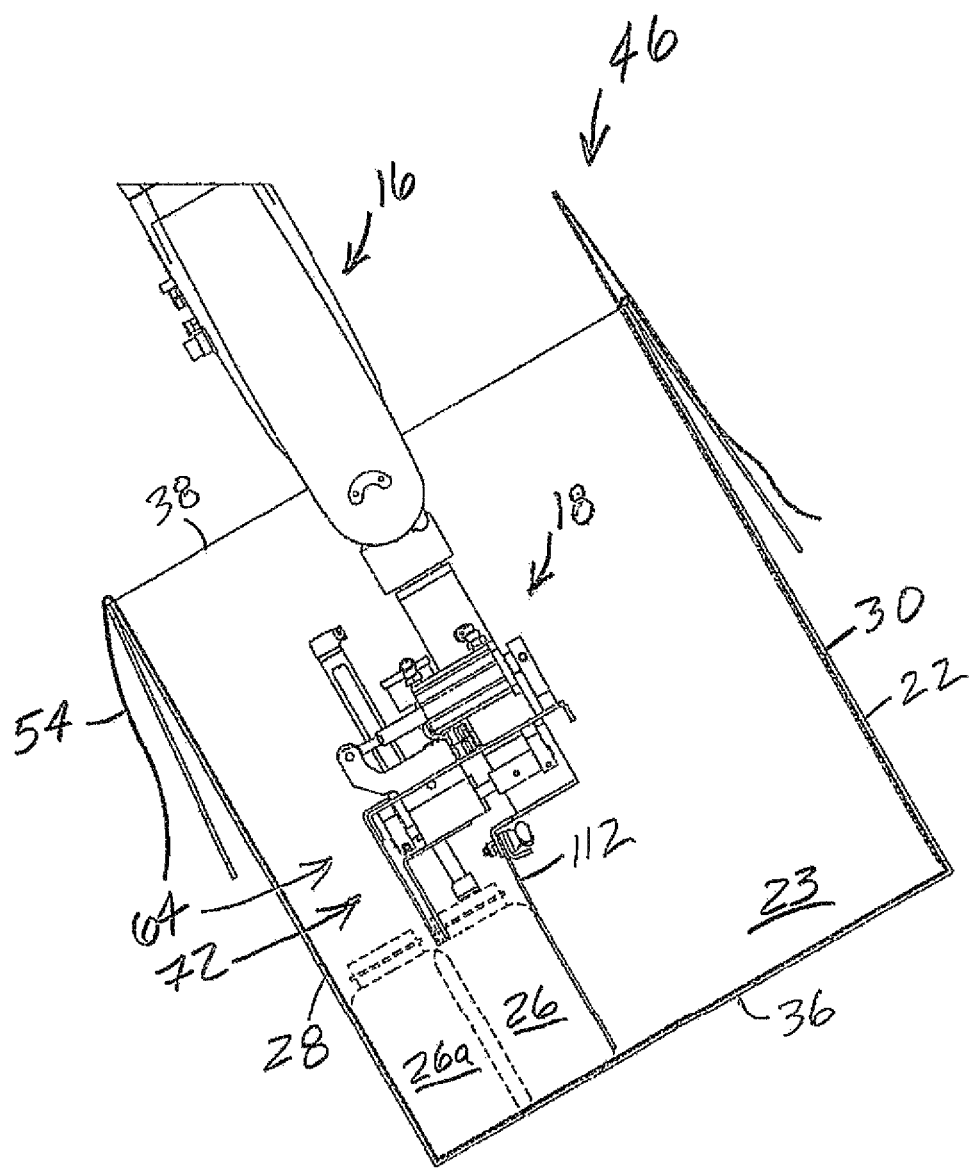

FIG. 15 shows head 18 further directing article row 26 to be placed in contact with both article row 26a (article row 26 to be placed and article row 26a being placed in staggered contact (see e.g., FIGS. 2 and 3)) and closed end 36 of container cavity 23. Staggered contact between already placed article row 26a and article row 26 to be placed is brought about by horizontal movement. That is, article row 26 to be placed is moved essentially parallel to closed end 36 relative to already placed article row 26a to remove the gap or distance 138 (FIG. 14) therebetween, and as a result, there is essentially no frictional movement along the facing surfaces of already placed article row 26a and article row 26 to be placed. Applicant has discovered that even during staggering of the facing surfaces of already placed article row 26a and article row 26 to be placed, such minimal friction, if any, that may be generated does not result in the facing surfaces sticking together and interfering with further formation of the article array.

Figure 16:
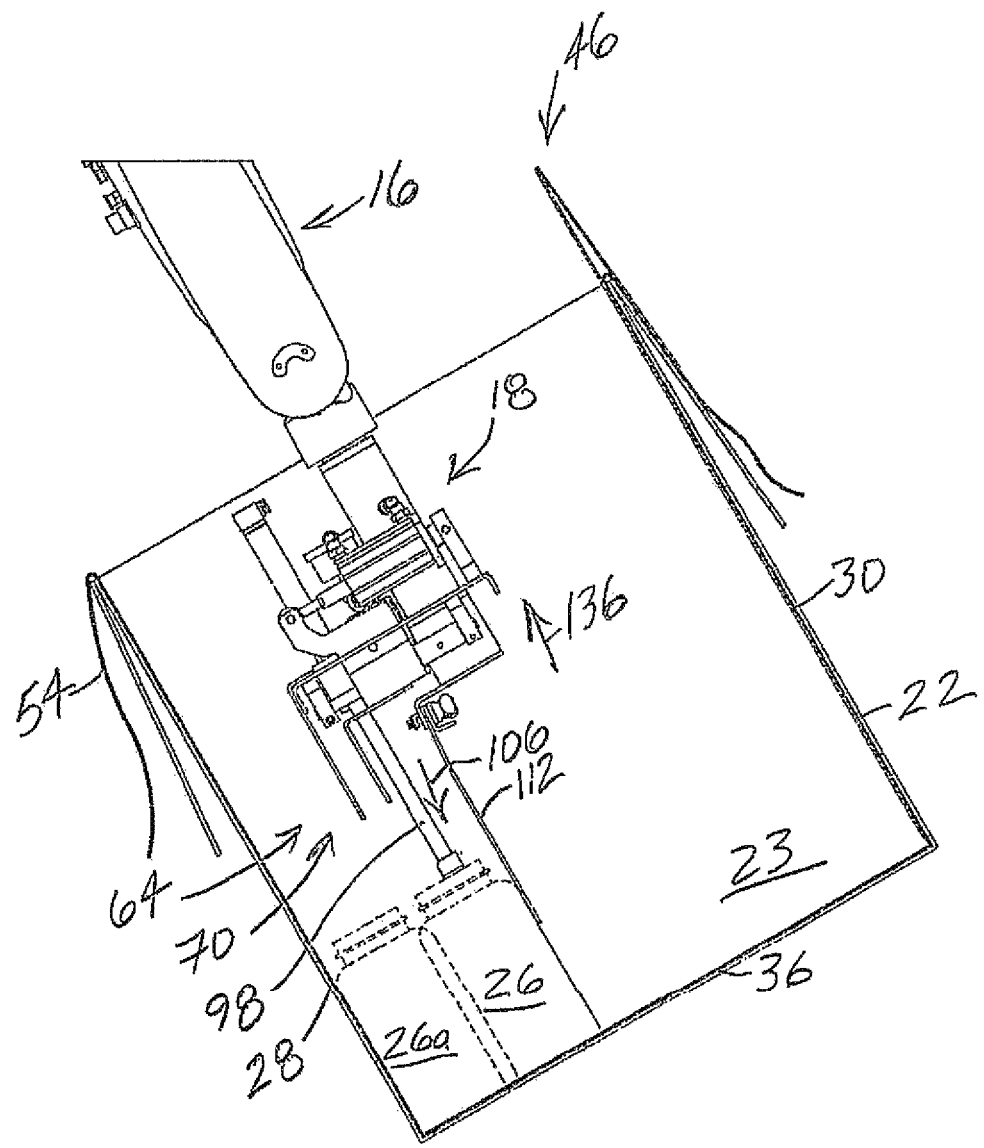
Figure 17:
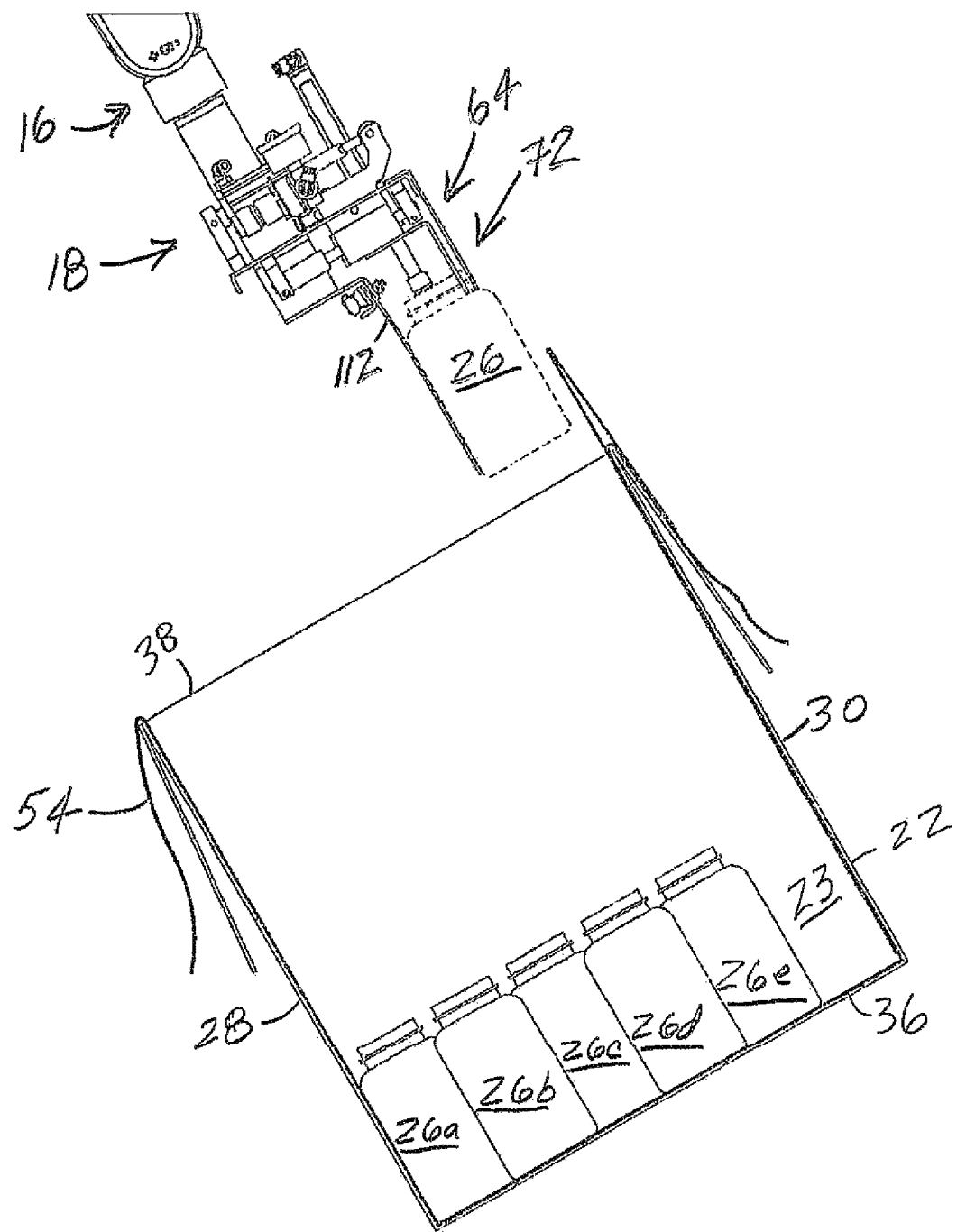

Once article row 26 to be placed is in contact with both article row 26a and closed end 36 of container cavity 23, as shown in FIG. 16, head 18 begins separating from article row 26 to be placed as a result of gripper 64 moving from closed position 72 (FIG. 15) to open position 70, and head 18 moving in a movement direction 136 away from closed end 36 of container cavity 23 that is generally parallel to side 28. Simultaneously, rod 98 extends from actuator 94 such that pusher 100, which was at least in close proximity, if not in physical contact with the top ends of articles of article row 26 to be placed prior to grippers 64 engaging article row 26 to be placed prior to moving article row 26 to be placed from conveyor 12 (FIG. 1), is brought into and maintained in physical contact or contact or is maintained in physical contact or contact with article row 26 to be placed. Moreover, preferably, the travel speed of head 18 in movement direction 136 is essentially the same as the travel speed of rod 98 and pusher 100, albeit in opposed directions. As a result, pusher 100 remains in stabilizing contact or physical contact with the top ends of article row 26 to be placed, becoming article row 26b (FIG. 17) of the article array being formed after separation from head 18. FIG. 17 further shows, after placement of article rows 26c, 26d, and 26e in a manner similar as previously discussed for placing article row 26b, head 18 being directed by robotic arm 16 to bring from conveyor 12 (FIG. 1) a final article row 26 to be placed that is directed in general alignment with open end 38 and side 30 of container 22 for completing formation of the article array by directing a final article row 26 to be placed in the remaining unfilled portion of container cavity 23.

Figure 18:
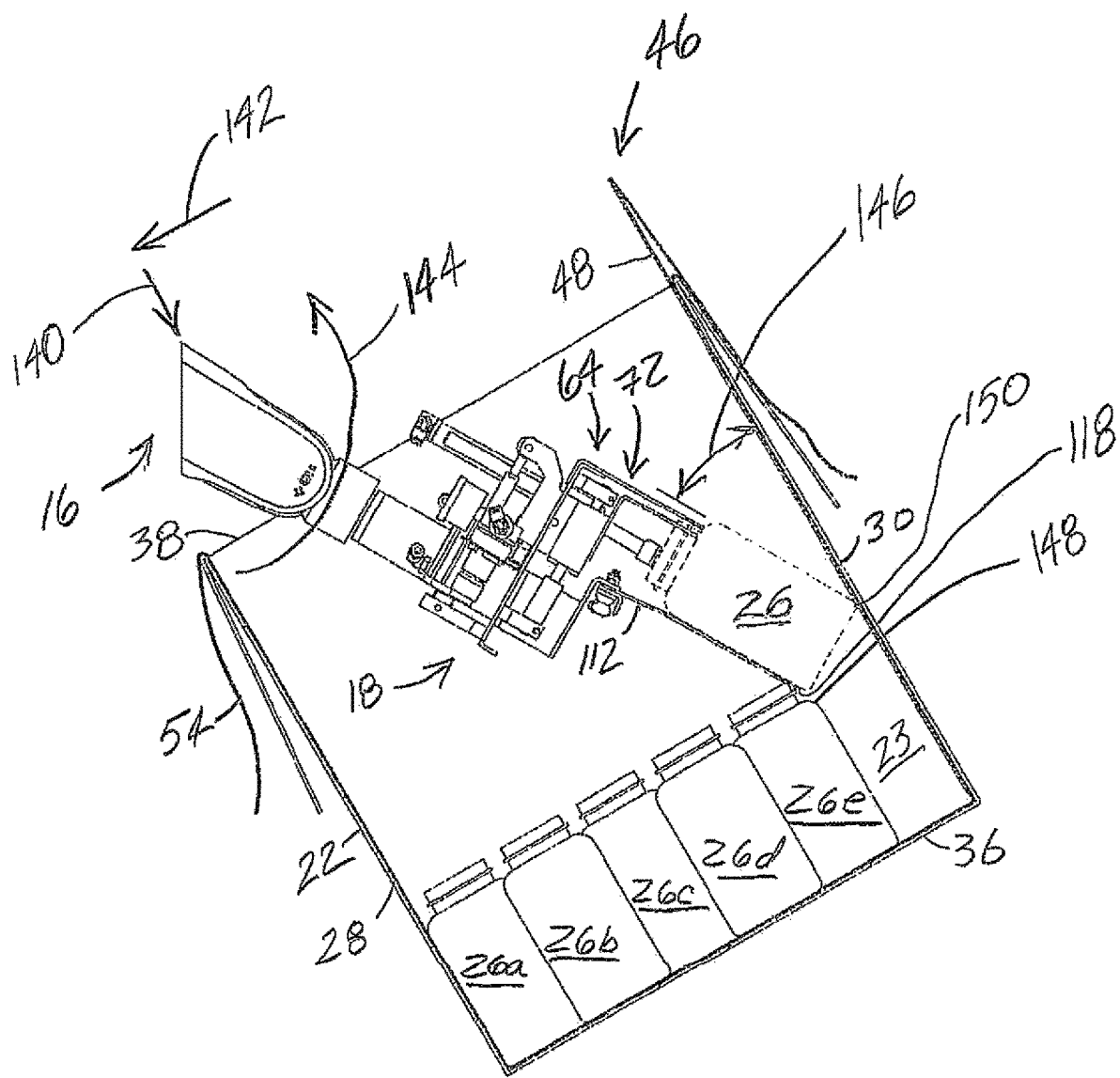

As shown in FIG. 18, relative to the general alignment position of head 18 and final article row 26 to be placed as shown in FIG. 17, robot arm 16 directs head 18 and final article row 26 to be placed in a combination of movement directions such as vertical movement direction 140, horizontal movement direction 142 and rotational movement 144 as required for end 118 of layer 112 to extend past a contact region 148 of row 26e such that article row 26e and article row 26 to be placed do not make physical contact in a non-horizontal direction while article row 26 to be placed is being positioned or placed to complete the article array, even when the width of the remaining unfilled container cavity 23 is approximately equal to or less than the width of article row 26 to be placed. In one embodiment, as a result of rotational movement 144, as a point of reference, the lateral surfaces of article row 26 to be placed and side 30 of container 22 subtends an acute angle 146 therebetween sufficient to help "clear" or at least minimize contact between layer 112 laterally covering the article row 26 to be placed and article row 26e. In other words, layer 112 is sized and positioned so that layer 112 prevents direct non-horizontal contact such as frictional contact between already placed article row 26e, the penultimate article row, and article row 26 to be placed, the final article row, for completing formation of the article array. Stated another way, layer 112 laterally covers the facing surfaces of penultimate article row 26e and final article row 26 to be placed to prevent contact therebetween. As head 18 and final article row 26 to be placed is being directed in the combination of movement and rotational movements, corner 150 of article row 26 to be placed may slidingly contact optional layer 46, providing a low friction contact permitting article row 26 to be placed from being damaged, or preventing damage to liner 54.

In one embodiment angle 146 is zero. In one embodiment, angle 146 is between zero and 10 degrees. In one embodiment, angle 146 is between 10 degrees and 20 degrees. In one embodiment, angle 146 is between 20 and 30 degrees. In one embodiment, angle 146 is 30 degrees. In one embodiment, angle 146 is between 30 degrees and 40 degrees. In one embodiment, angle 146 is greater than 40 degrees.

In one embodiment, the directed movement of head 18 moving final article row 26 to be placed by robot arm 16, i.e., horizontal movement direction 142, vertical movement direction 140 and rotational movement 144 may be performed sequentially in any order, so long as non-horizontal contact such as frictional contact between already placed penultimate article row 26e, and final article row 26 to be placed for completing formation of the article array is prevented by layer 112. In one embodiment, at least one of the directed movement of head 18 moving final article row 26 to be placed by robot arm 16, i.e., horizontal movement direction 142, vertical movement direction 140 and rotational movement 144 may be performed simultaneously in any order, so long as non-horizontal contact such as frictional contact between already placed penultimate article row 26e, and final article row 26 to be placed for completing formation of the article array is prevented by layer 112. Conceptually, such movements of head 18 by robot arm 16 are performed to manipulate or direct the article row 26 to be placed simultaneously over and around penultimate article row 26e and in front of side 30 of container 22, while minimizing contact with both, such contact being unavoidable when article row 26 to be placed is wider than the width of the unfilled remaining container cavity 23 between penultimate article row 26e and side 30 for completing formation of the article array, and generally unavoidable when article row 26 to be placed is approximately equal to the width of the unfilled remaining container cavity 23 between penultimate article row 26e and side 30 for completing formation of the article array. It is appreciated by those having ordinary skill in the art that it may be possible to manipulate or direct the article row 26 to be placed simultaneously over and around penultimate article row 26e and in front of side 30 of container 22, while minimizing contact with both, without rotational movement 146 if article row 26 to be placed is sufficiently larger than the width of the unfilled remaining container cavity 23 between penultimate article row 26e and side 30 for completing formation of the article array.

Figure 19:
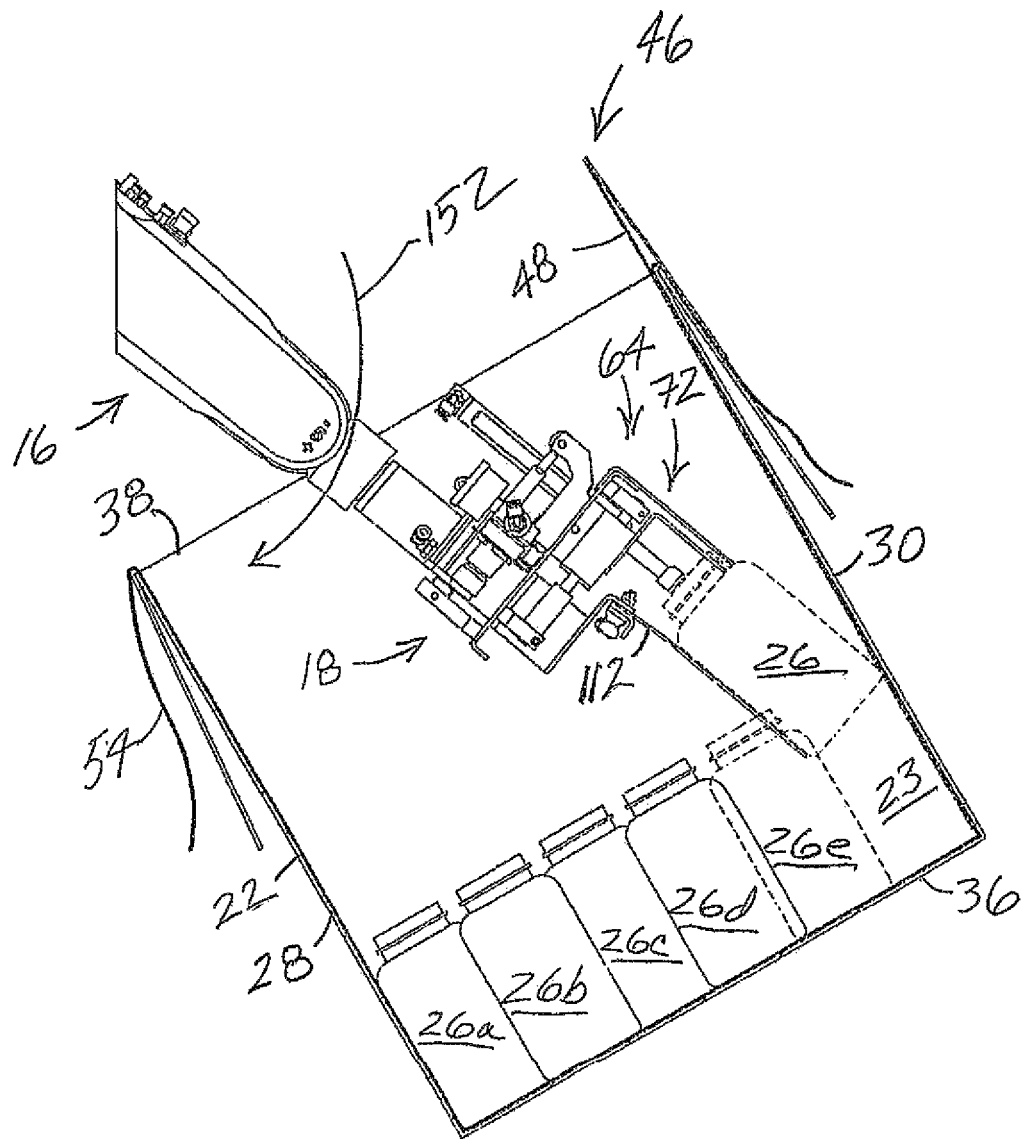
Figure 20:
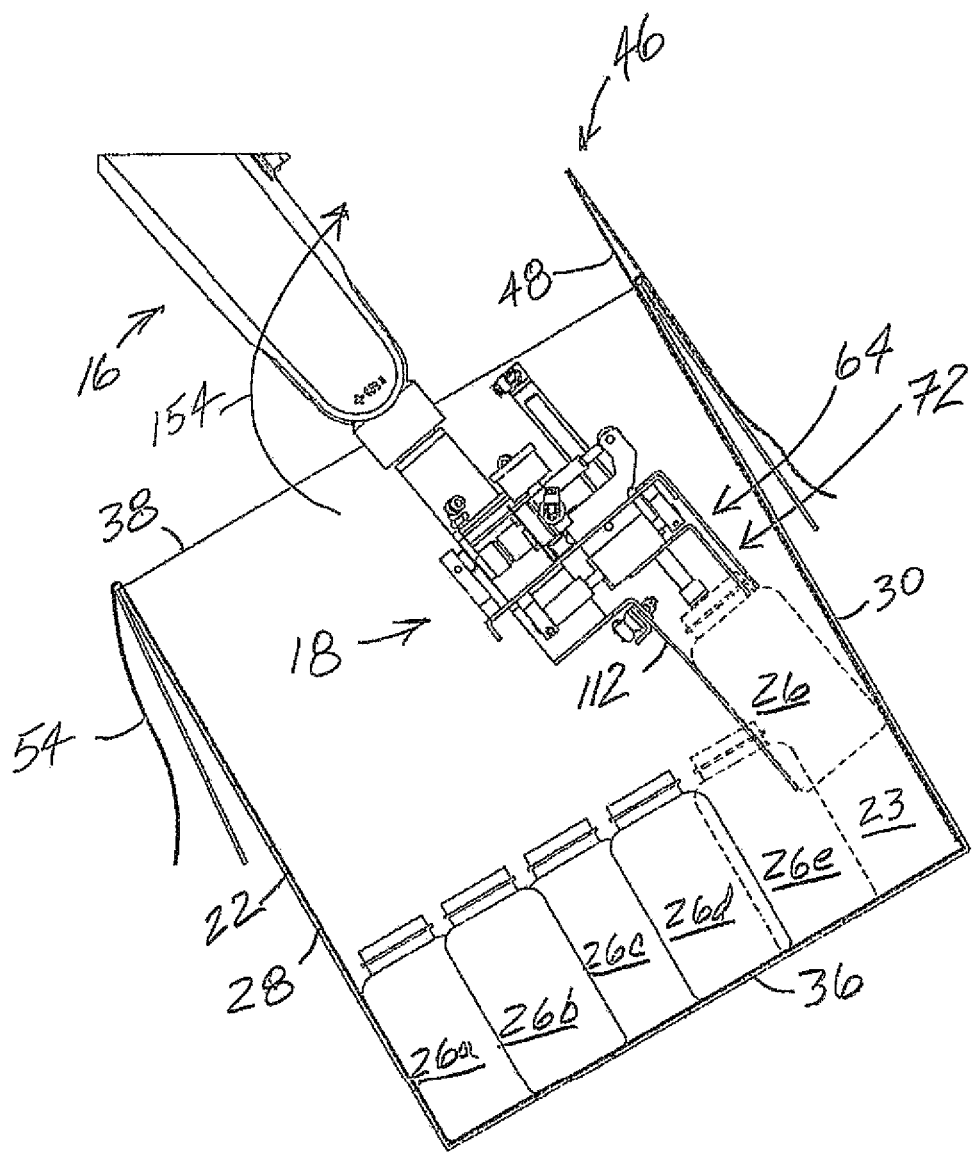

FIGS. 19 and 20 show head 18 and final article row 26 to be placed being directed by robot arm 16 in respective rotational movement 152, 154, permitting article row 26 to be placed to be urged toward its final placed position, further filling the final unfilled portion of cavity 23 for forming the article array.

Figure 21:
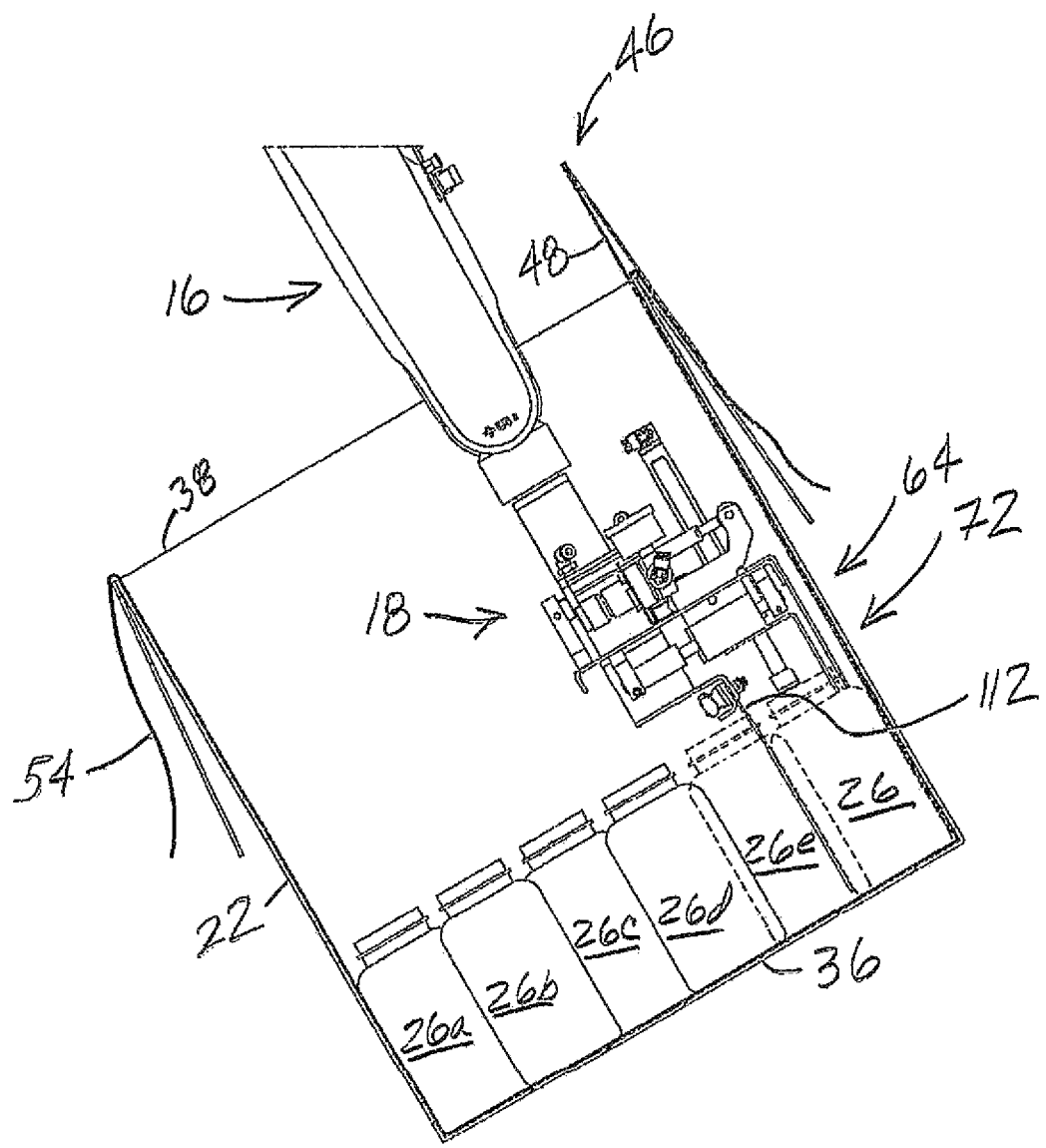
Figure 22:
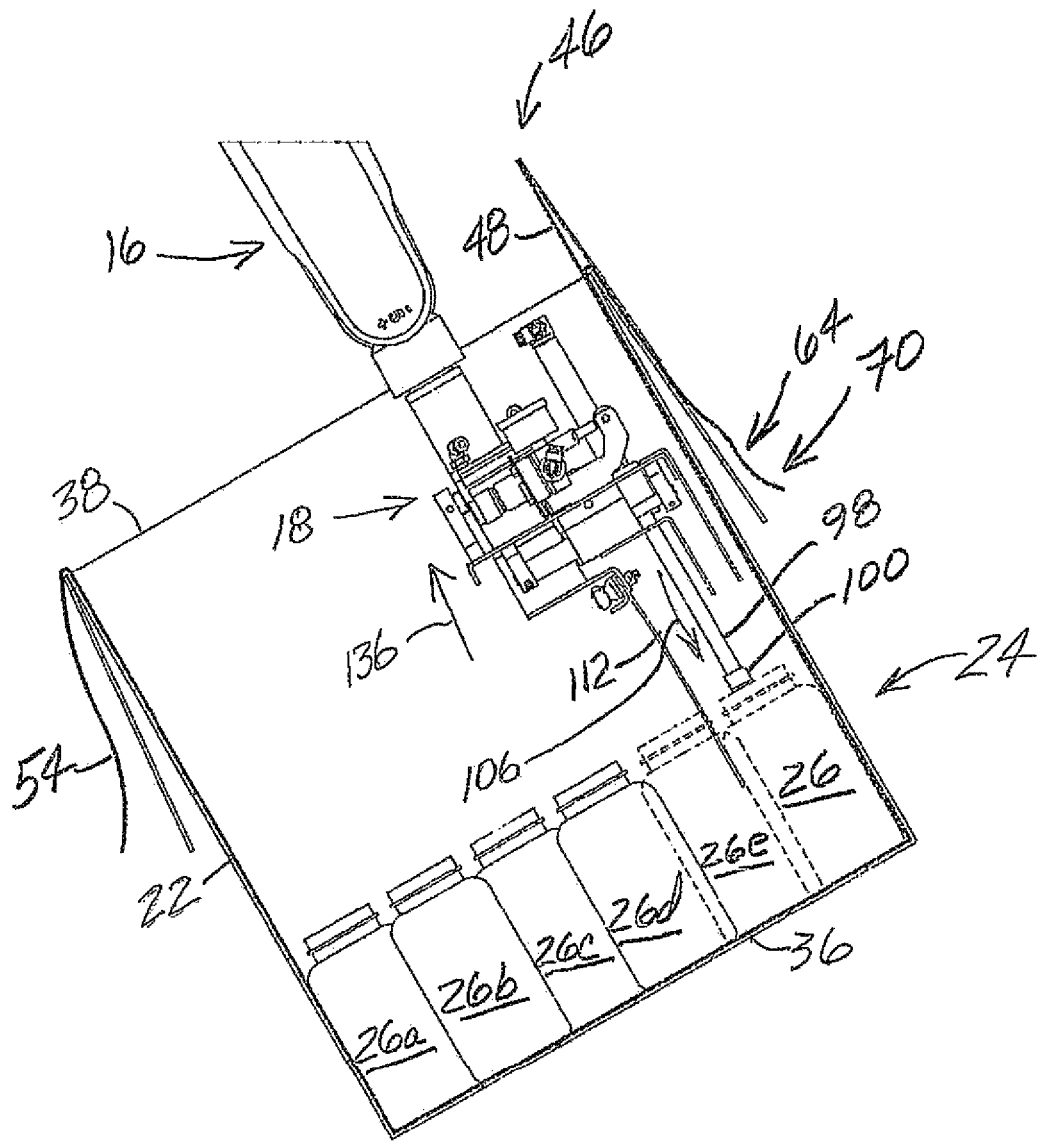

FIG. 21 shows article row 26 to be placed moved into its final position, filling the final unfilled portion of cavity 23 for forming the article array. As shown in FIG. 22, once article row 26 to be placed has been moved into its final position, filling the final unfilled portion of cavity 23 for forming the article array, grippers 64 are moved to open position 70, and head 18 begins separating from article row 26 to be placed as a result of gripper 64 moving from closed position 72 (FIG. 11) to open position 70, and head 18 moving in a movement direction 136 away from closed end 36 of container cavity 23 that is generally parallel to side 30.

Once head 18 separation is achieved, final article row 26 to be placed becomes final article row 26*f*, and article array 24 is fully formed.

In one embodiment, it is possible to change the order of forming the article arrays, i.e., simultaneously partially forming different article arrays, versus completely forming the bottom article array before starting the next article array, etc., if desired.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A head for use in forming an article array in a container, comprising:
   a frame having a first long side and a second long side opposite the first long side defining a longitudinal axis, the frame includes a gripper adapted to selectively engage and disengage an article row for permitting placement thereof; and
   a flexible layer connected to the frame and extending parallel to the longitudinal axis and affixed on the first long side of the frame and the gripper positioned on the opposed second long side of the frame, the gripper having a first gripper portion fixed relative to the frame and configured to selectively engage an outer surface of a container neck and a second gripper portion moveable relative to the first gripper portion and configured to selectively engage an inner portion of the container neck,
   wherein during formation of the article array in the container having an open end and defining a cavity having a first side and an opposed second side, the article array being formed by sequential placement of adjacent article rows in the container cavity from the first side toward the second side by the head, the flexible layer preventing contact between a most recently positioned article row in the container cavity and a corresponding article row being positioned in the container cavity,
   wherein in a final pre-formation arrangement of the article array, the most recently positioned article row is a penultimate article row in the container cavity and the corresponding article row being positioned in the container cavity is a final article row for completing formation of the article array, and
   wherein in response to the article array being in the final pre-formation arrangement, the final pre-formation arrangement having a remaining unfilled portion of the container cavity between the penultimate article row and the container for receiving the final article row having a width approximately equal to or less than a width of the final article row.

2. The head of claim 1, wherein the flexible layer having a first end connected to the frame and extending parallel to the longitudinal axis and positioned in close proximity to one side of the gripper, the flexible layer extending away from the first end to a second end.

3. The head of claim 1, wherein the flexible layer has at least one slot formed therein.

4. The head of claim 3, wherein the at least one slot is perpendicular to the longitudinal axis.

5. The head of claim 1 further comprises a pusher for selectively disengaging the most recently positioned article row from the head.

6. The head of claim 1, wherein the gripper is adapted to selectively engage and disengage a neck of each article of the corresponding article row being positioned.

7. The head of claim 1, wherein the flexible layer is sized to laterally cover portions of the corresponding article row being placed facing the most recently positioned article row.

8. The head of claim 1, wherein the flexible layer is selectively movable relative to the frame.

9. A method for forming the article array in the container using the head of claim 1, the method comprising:
   providing the container having the open end defining the cavity; and
   sequentially placing adjacent article rows in the container cavity along the first side toward the second side by the head, the head preventing contact between each adjacent article row during their placement in the container cavity according to a sequence of having a most recently positioned article row in the container followed by a corresponding article row being positioned in the container cavity, wherein in a final pre-formation arrangement of the article array, the most recently positioned article row is a penultimate article row in the container cavity and the corresponding article row being positioned in the container cavity is a final article row for completing formation of the article array, wherein in response to the article array being in the final pre-formation arrangement, the final pre-formation arrangement having a remaining unfilled portion of the container cavity between the penultimate article row and the container for receiving the final article row having a width approximately equal to or less than a width of the final article row.

10. The method of claim 9 further comprises after providing the container, installing a liner in the container.

11. The method of claim 10, further comprising positioning a second flexible layer over a corresponding portion of the container liner.

12. A system for forming an article array in a container, comprising:
   a head having a frame with a first long side and a second long side opposite the first long side defining a longitudinal axis, the frame includes a gripper adapted to selectively engage and disengage an article row for permitting placement thereof;
   a flexible first layer connected to the frame and extending parallel to the longitudinal axis and affixed on the first long side of the frame and the gripper positioned on the opposed second long side of the frame, the gripper having a first gripper portion fixed relative to the frame and configured to selectively engage an outer surface of a container neck and a second gripper portion moveable relative to the first gripper portion and configured to selectively engage an inner portion of the container neck; and
   a second layer positioned in close proximity to a side of the container;
   wherein during formation of the article array in the container having an open end and defining a cavity having a first side and an opposed second side, the article array being formed by sequential placement of adjacent article rows in the container cavity from the first side toward the second side by the head, the flexible first layer preventing contact between a most recently positioned article row in the container cavity and a corresponding article row being positioned in the container, wherein in a final pre-formation arrangement of the article array, the most recently positioned article row is a penultimate article row in the container cavity and the corresponding article row being positioned in the container cavity is a final article row for completing formation of the article array, and wherein in response to the article array being in the final pre-formation arrangement, the final pre-formation arrangement having a remaining unfilled portion of the container cavity between the penultimate article row and the container for receiving the final article row, the second layer covers at least the second side of the remaining unfilled portion of the container cavity, the remaining unfilled portion of the container cavity having a width that is approximately equal to or less than a width of the final article row.

13. The system of claim 12, wherein the first flexible layer having a first end connected to the frame and extending parallel to the longitudinal axis and positioned in close proximity to one side of the gripper, the first flexible layer extending away from the first end to a second end.

14. The system of claim 12, wherein the first flexible layer has at least one slot formed therein.

15. The system of claim 14, wherein the at least one slot is perpendicular to the longitudinal axis.

16. The system of claim 12 further comprises a pusher for selectively disengaging the most recently positioned article row from the head.

17. The system of claim 12, wherein the gripper is adapted to selectively engage and disengage a neck of each article of the corresponding article row being positioned.

18. The system of claim 12, wherein the second layer is sized to laterally cover portions of the corresponding article row being placed facing the most recently positioned article row.

19. The system of claim 12, wherein the first flexible layer is selectively movable relative to the frame.

20. The system of claim 12, wherein the second layer is adapted to be positioned over a corresponding portion of a container liner.

* * * * *